(12) United States Patent
  Mabuchi

(10) Patent No.: US 11,783,969 B2
(45) Date of Patent: Oct. 10, 2023

(54) TWISTED WIRE PRODUCING APPARATUS AND TWISTED WIRE PRODUCING METHOD

(71) Applicant: YAZAKI CORPORATION, Tokyo (JP)

(72) Inventor: Miyoshi Mabuchi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 664 days.

(21) Appl. No.: 16/996,854

(22) Filed: Aug. 18, 2020

(65) Prior Publication Data
  US 2020/0381146 A1   Dec. 3, 2020

Related U.S. Application Data

(62) Division of application No. 15/872,777, filed on Jan. 16, 2018, now Pat. No. 10,854,359.

(30) Foreign Application Priority Data

Jan. 17, 2017   (JP) .................................. 2017-005620

(51) Int. Cl.
  *H01B 13/02*   (2006.01)
  *B21F 7/00*   (2006.01)
  *B60R 16/02*   (2006.01)

(52) U.S. Cl.
  CPC ........... *H01B 13/0207* (2013.01); *B21F 7/00* (2013.01); *B60R 16/0207* (2013.01)

(58) Field of Classification Search
  CPC .... B21F 7/00; B21F 15/04; B21F 9/00; B21F 9/002; B21F 9/02; H01B 13/02; H01B 13/0207; D07B 3/00
  (Continued)

(56) References Cited

U.S. PATENT DOCUMENTS 539,139 A * 5/1895 Lee ........................... B21F 7/00
  140/149
  1,947,166 A * 2/1934 Nydegger .............. H01B 13/02
  174/34
  (Continued)

FOREIGN PATENT DOCUMENTS

CN   201289764 Y   8/2009
  CN   103038837 A   4/2013
  (Continued)

OTHER PUBLICATIONS

DE 19735655 A1, Kredler et al. Mar. 1999.*
  (Continued)

*Primary Examiner* — Edward T Tolan
(74) *Attorney, Agent, or Firm* — KENEALY VAIDYA LLP

(57) ABSTRACT

A twisted wire producing apparatus includes an electric wire twisting unit that twists two electric wires, a controller that controls the electric wire twisting unit, and a tension adding part that adds tension to the two electric wires. The electric wire twisting unit includes a one end chuck part, the other end chuck part, and chuck rotating parts for rotating the one end chuck part and/or the other end chuck part under control of the controller. The other end chuck part includes a base, a chuck main body, twist prevention parts, and a wire length difference absorbing part. The wire length difference absorbing part includes an inter-electric wire inserting part which is movable in a direction perpendicular to the electric wires extending direction.

1 Claim, 29 Drawing Sheets

(58) Field of Classification Search
USPC ........................................................ 140/149
See application file for complete search history.

(56) References Cited

U.S. PATENT DOCUMENTS

| | | | | |
|---|---|---|---|---|
| 3,827,465 | A | * | 8/1974 | Loy .................... H01B 13/0207 140/149 |
| 3,831,361 | A | * | 8/1974 | Ullmann .................. D07B 3/12 57/25 |
| 3,884,276 | A | * | 5/1975 | Poplaski ................ H01B 13/02 29/748 |
| 6,167,919 | B1 | * | 1/2001 | Fuchsl ............... H01B 13/0207 140/149 |
| 9,416,488 | B2 | | 8/2016 | Stier |
| 10,418,155 | B2 | * | 9/2019 | Keil ................... H01B 13/0278 |
| 10,441,993 | B2 | | 10/2019 | Morales et al. |
| 10,984,925 | B2 | * | 4/2021 | Shirai ................ H01B 13/0271 |
| 2004/0050446 | A1 | * | 3/2004 | Ichikawa .................. B21F 7/00 140/149 |
| 2014/0352867 | A1 | | 12/2014 | McLane et al. |

FOREIGN PATENT DOCUMENTS

| | | |
|---|---|---|
| CN | 104217823 A | 12/2014 |
| CN | 106169338 A | 11/2016 |
| CN | 106169339 A | 11/2016 |
| JP | 2008-277032 A | 11/2008 |
| JP | 2012-28199 A | 2/2012 |
| WO | 2012/015058 A1 | 2/2012 |
| WO | 2015/190581 A1 | 12/2015 |
| WO | 2015/190582 A1 | 12/2015 |
| WO | 2015/190583 A1 | 12/2015 |
| WO | 2015/194491 A1 | 12/2015 |

OTHER PUBLICATIONS

KR 100792877 B1, Kim Jan. 2008.*
JP 2007-227185 A, Suzuki Sep. 2007.*
JP 56-119861 A, Maeno et al. Sep. 1981.*

* cited by examiner

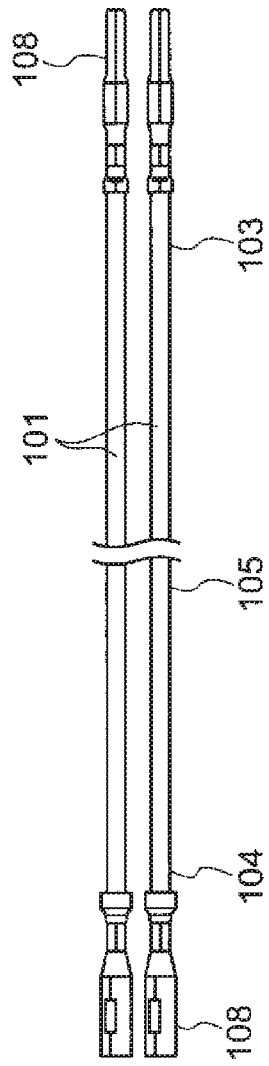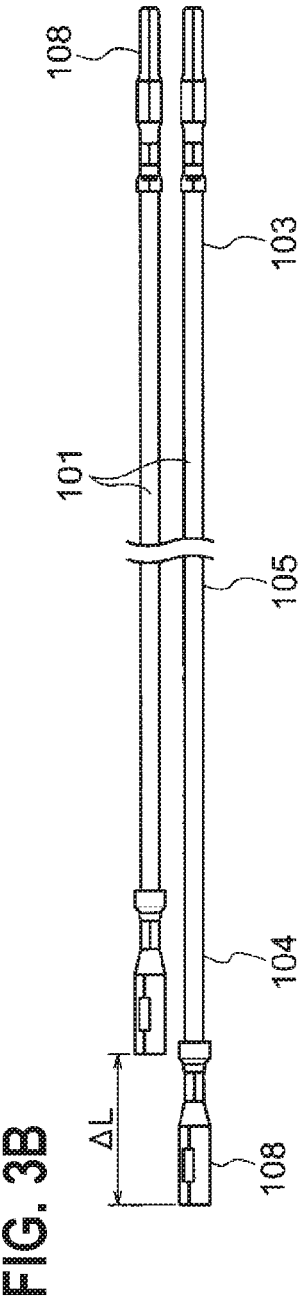

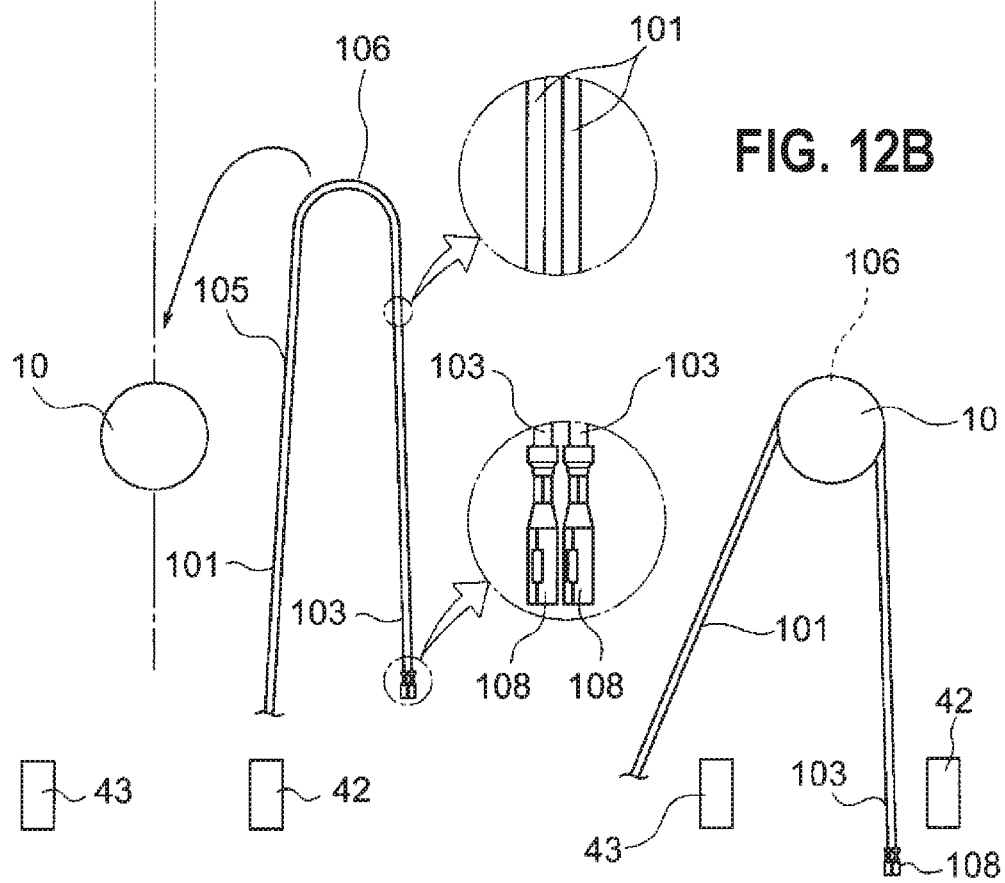

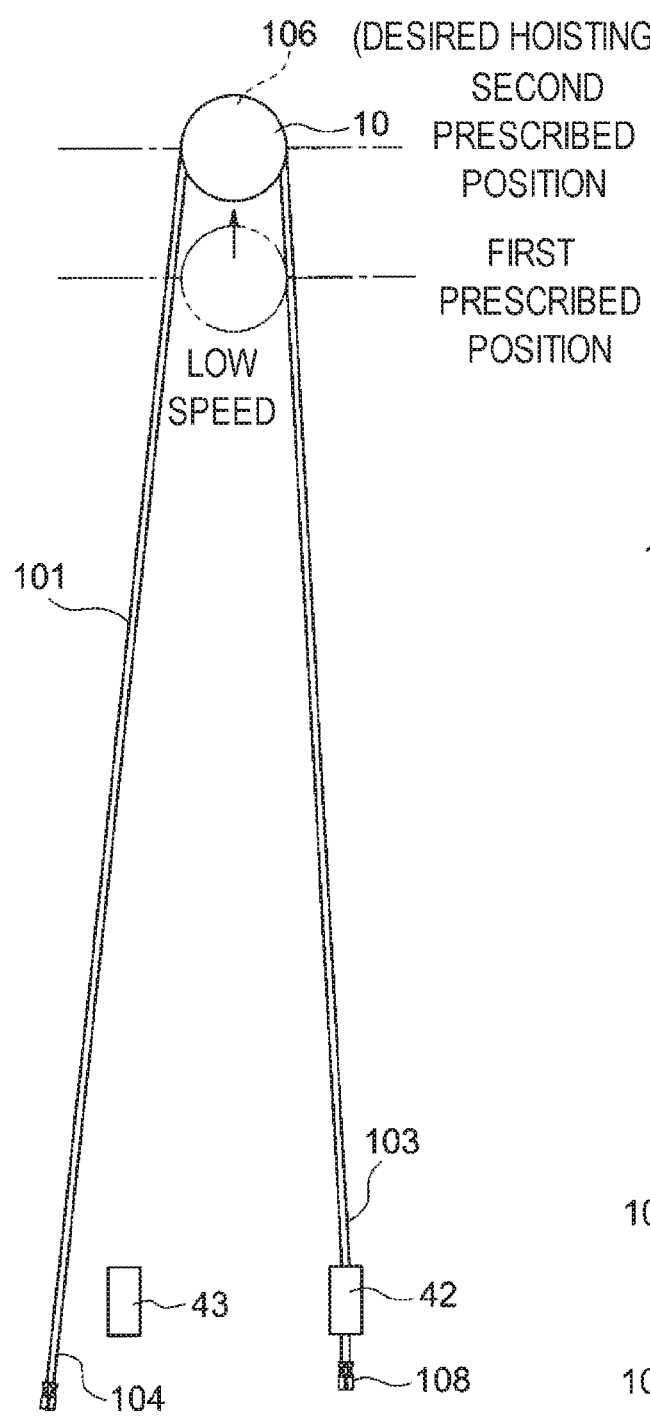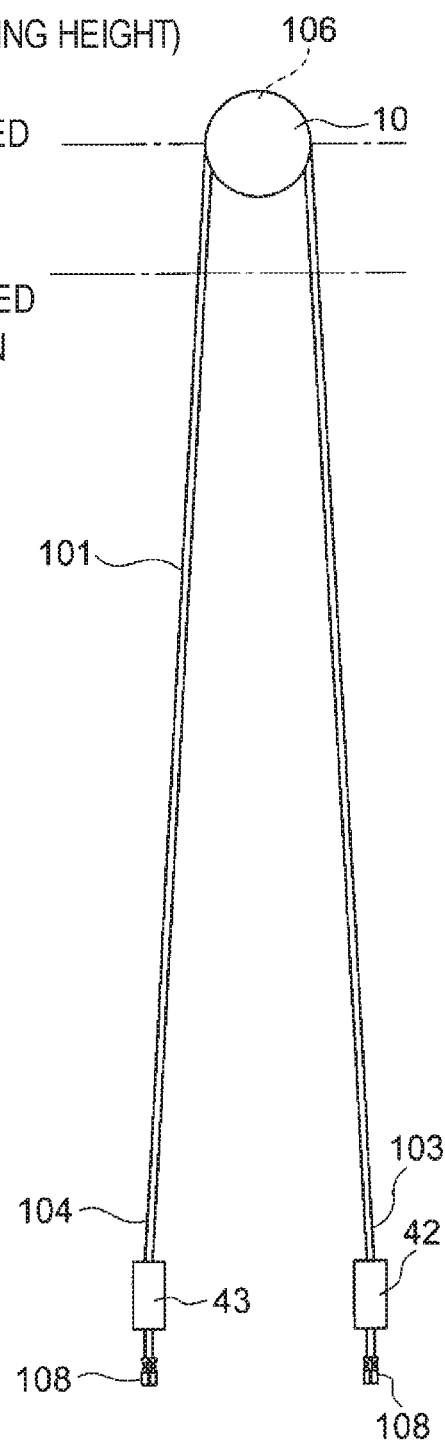

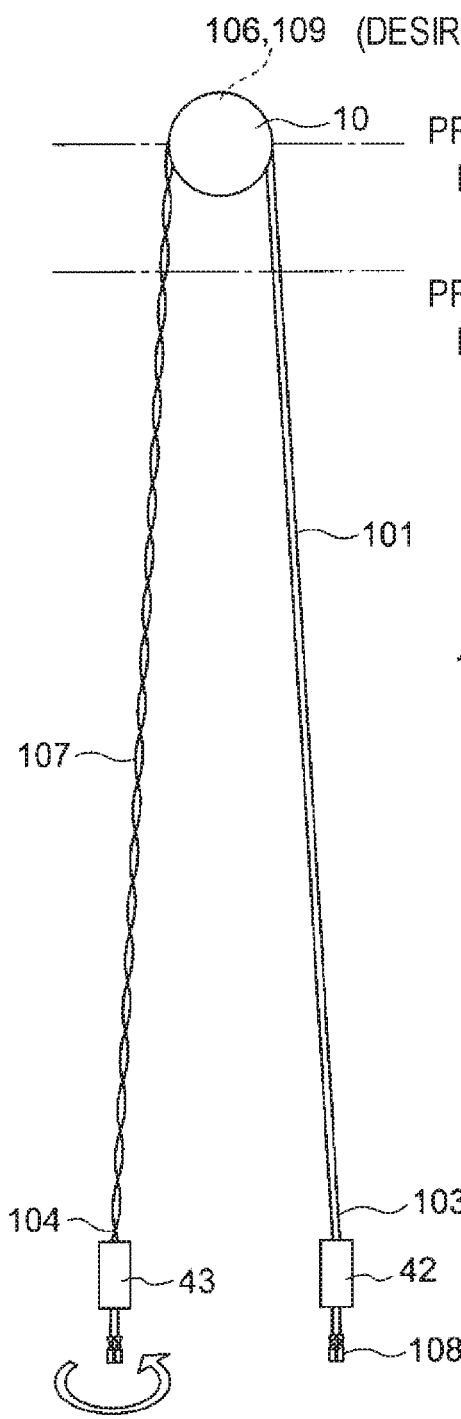
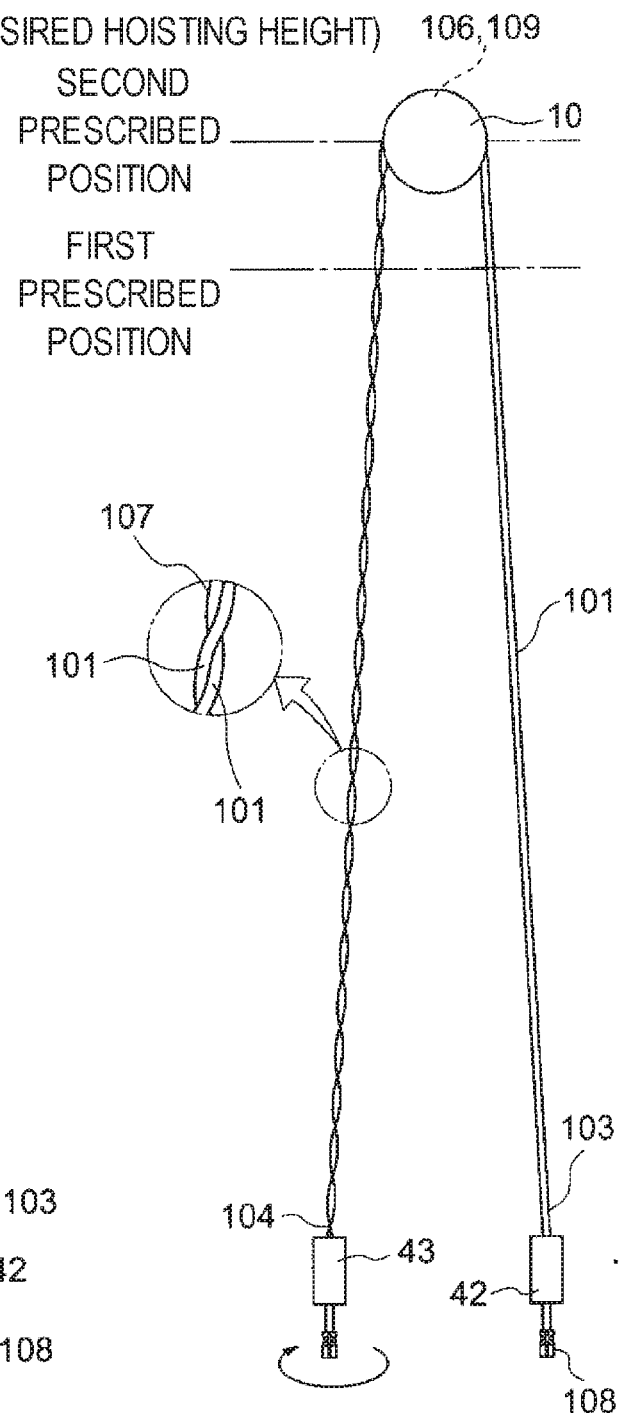
FIG. 15A
FIG. 15B

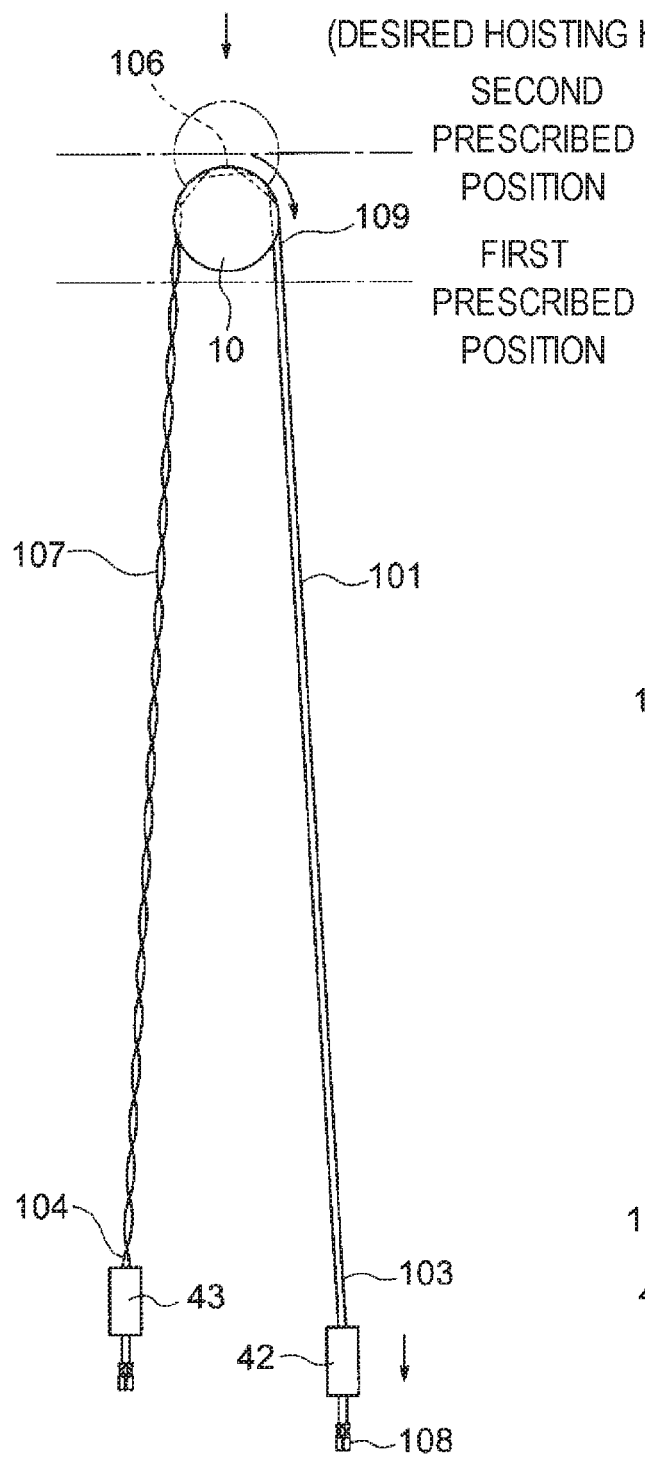
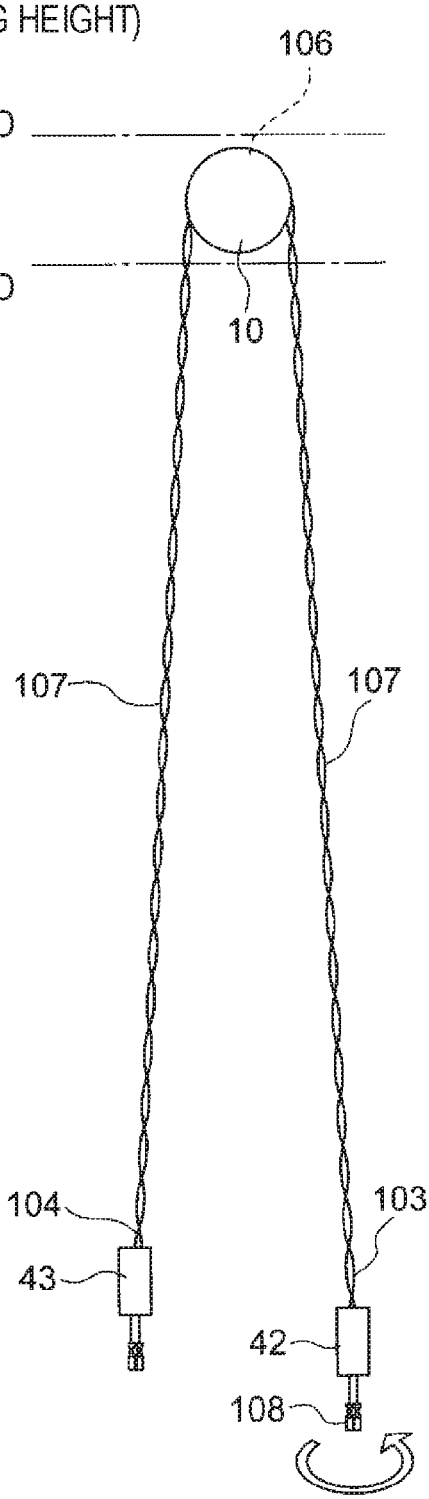

POSITION OF DESIRED HOISTING HEIGHT
(PRODUCTION OF LONG TWISTED WIRE)

POSITION OF DESIRED HOISTING HEIGHT
(PRODUCTION OF SHORT TWISTED WIRE)

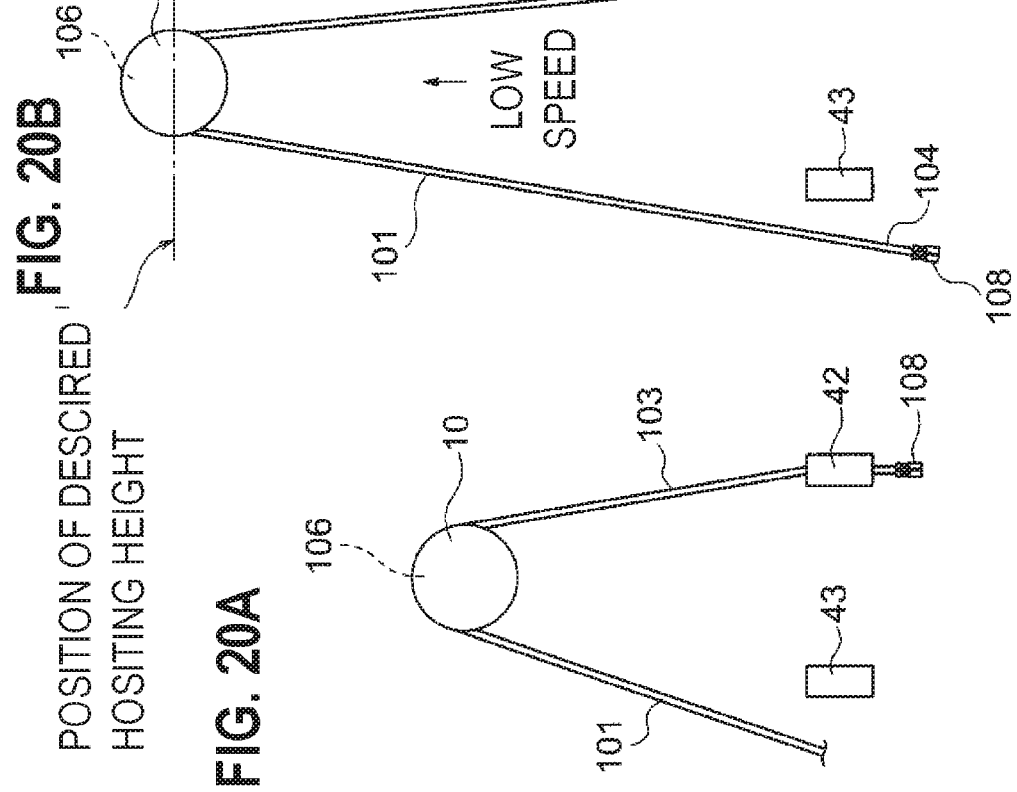

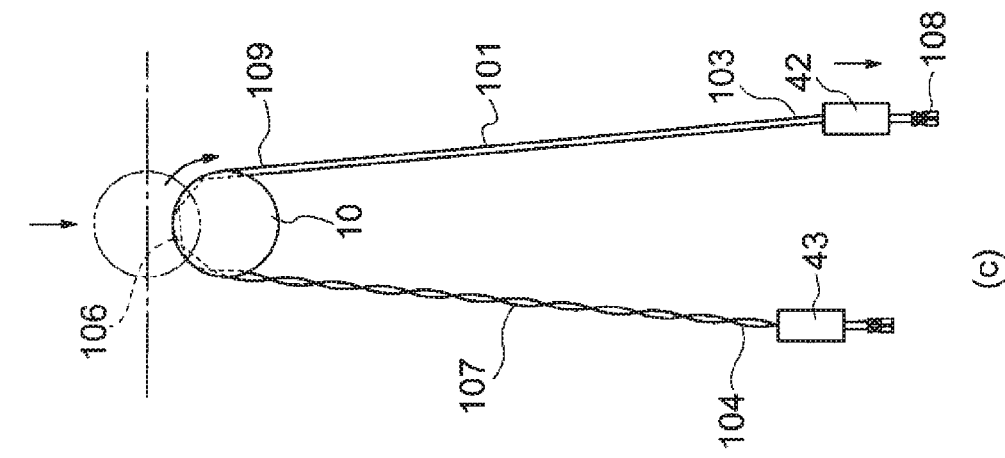
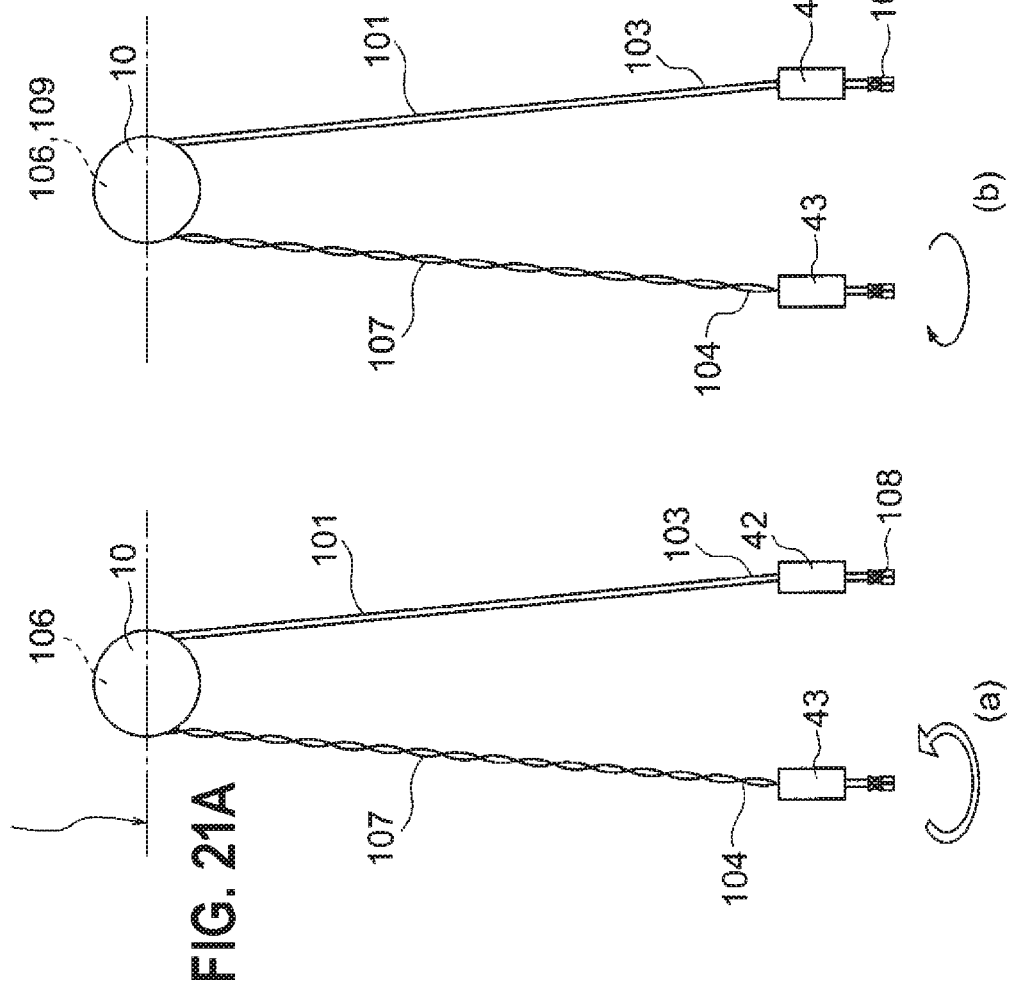

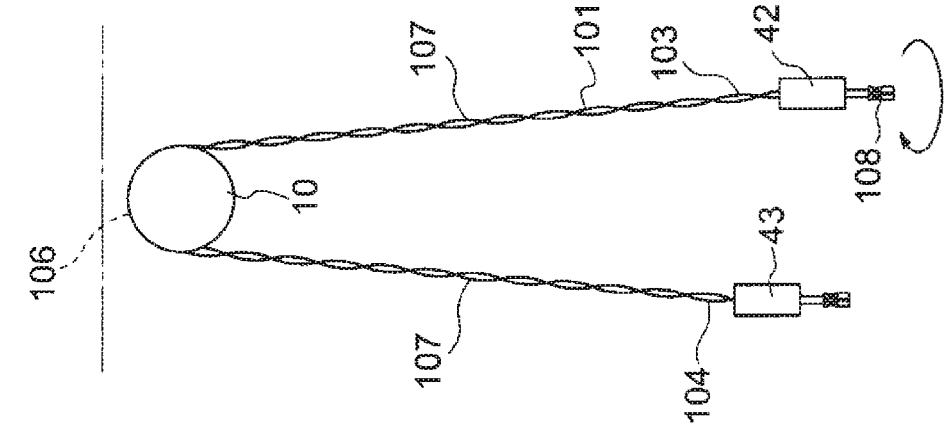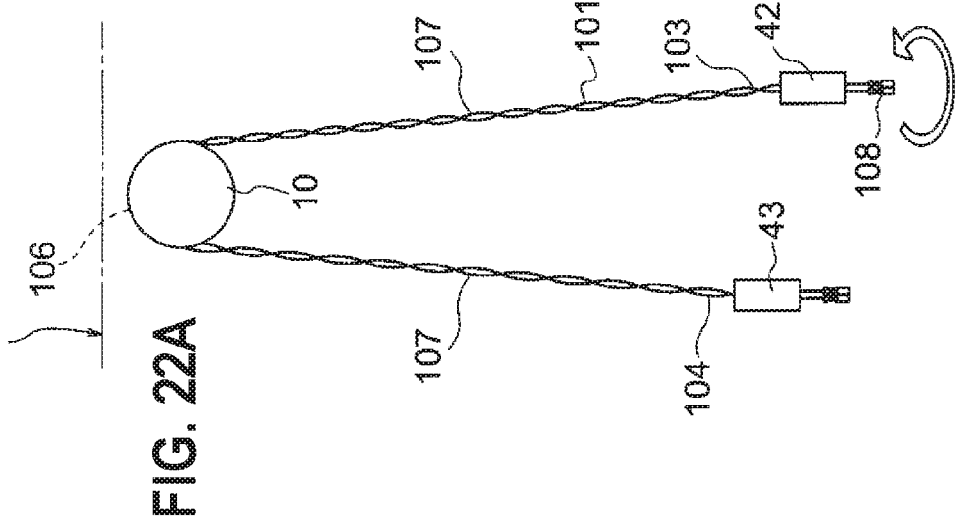

POSITION OF DESCIRED HOSITING HEIGHT

TWISTED WIRE PRODUCING APPARATUS AND TWISTED WIRE PRODUCING METHOD

CROSS REFERENCE TO RELATED APPLICATION

This application is a Divisional application and claims priority benefit under 35 U.S.C. § 120 to co-pending U.S. patent application Ser. No. 15/872,777 filed on Jan. 16, 2018, and claims priority benefit under 35 U.S.C. § 119 to Japanese Patent Application No. 2017-005620 filed on Jan. 17, 2017, which are both hereby incorporated in their entireties by reference.

BACKGROUND OF THE INVENTION

1. Technical Field

The present invention relates to a twisted wire producing apparatus for producing a twisted wire having a twisted section and terminal untwisted sections continuing at opposite sides of the twisted section by twisting two electric wires, and a twisted wire producing method using the same.

2. Background Art

For example, to electrically connect between devices mounted on a vehicle, a wire harness is routed in the vehicle. The wire harness includes a plurality of sub-harnesses. The wire harness of this configuration is produced by combining the sub-harnesses to fit a desired circuit pattern. One of the sub-harnesses includes a twisted pair wire (a twisted wire).

In FIGS. 28A and 28B, a twisted wire 102 having a twisted section 107 is produced by twisting two electric wires 101. As an apparatus for producing this twisted wire 102, one disclosed in, for example, JP-A-2008-277032 is known. A twisted wire producing apparatus (an electric wire twisting apparatus) of JP-A-2008-277032 includes a work station, a holder that holds one end of each of two electric wires on this work station, a motor that rotates the holder around an axis, a pair of rotary holders formed by mutually juxtaposing single core holders, each of which holds the other end of one of the electric wires to be rotatable around an axis, a movable holder that is provided to be movable along the axis, a driver that moves the movable holder along the axis, and a controller that controls a movement speed, and the like of the movable holder.

Meanwhile, the following problems regarding the production of the twisted wire are pointed out in JP-A-2012-28199 (see FIG. 7). That is, as illustrated in FIG. 29, in a producing apparatus including a common clamp 202 that fixes one end of each of two electric wires 201, clamps 203 that individually fix the other ends of the two electric wires 201, a device (not illustrated) that applies back tension from the common clamp 202 side, and a rotor 204 that is arranged between the common clamp 202 and each clamp 203, with regard to the production of the twisted wire, if the two electric wires 201 have a variation within a dimensional tolerance (in a state in which there is a wire length difference by which one thereof is longer than the other), a problem that the long electric wire 201 is twisted to be in a slightly loose state is pointed out.

In the related art, when the long electric wire 201 is twisted in a slightly loose state, the variation (the wire length difference) is absorbed by the twisted section although particularly not illustrated.

When this absorption is made, accuracy of a twist pitch is naturally reduced, and thus the twisted section is formed in an uneven state. The unevenly formed state has a problem that a quality needs to be guaranteed by performing, for instance, measurement of an inter-wire gap and a characteristic impedance of the twisted section, and thus a high production cost is required.

The present invention was made in view of the above circumstances, and an object thereof is to provide a twisted wire producing apparatus and a twisted wire producing method capable of improving reliability of a twisted wire and contributing to reduction in cost.

SUMMARY OF THE INVENTION (1) According to an aspect of the invention, a twisted wire producing apparatus for producing a twisted wire having a twisted section and terminal untwisted sections each continuing to corresponding one of sides of the twisted section by twisting two electric wires. The twisted wire producing apparatus includes:
  an electric wire twisting unit that performs twisting on the two electric wires;
  a controller that controls the electric wire twisting unit; and
  a tension adding part that adds tension to the two electric wires;
  wherein the electric wire twisting unit includes a one end chuck part for chucking one ends of the two electric wires, the other end chuck part for chucking the other ends of the two electric wires, and chuck rotating parts for rotating the one end chuck part and/or the other end chuck part under control of the controller,
  the other end chuck part includes:
    a base;
    a chuck main body provided at the base and configured to fix the other ends of the two electric wires at prescribed positions;
    twist prevention parts directly or indirectly provided at the base corresponding to a boundary position between the twisted section and the terminal untwisted section; and
    a wire length difference absorbing part directly or indirectly provided at the base to absorb a wire length difference occurring at the two electric wires,
  the wire length difference absorbing part includes an inter-electric wire inserting part stuck between electric wires of the two electric wires, and
  the inter-electric wire inserting part is provided as a part that is movable in a direction perpendicular to a direction in which the two electric wires extend, and is disposed corresponding to an intermediate position between the twist prevention parts and the chuck main body.

(2) In the twisted wire producing apparatus of (1), the inter-electric wire inserting part is formed in a shape of a pin having a circular cross section and is formed as a replaceable component to match absorption amount of the wire length difference by replacing the inter-electric wire inserting part with the other inter-electric wire inserting part having a different diameter.

(3) In the twisted wire producing apparatus of (1) or (2), the other end chuck part further includes a terminal contact part for bringing tips of terminal fittings provided on the two electric wires into contact with each other at the same position.

(4) According to another aspect of the invention, a twisted wire producing method for producing a twisted wire having a twisted section and terminal untwisted sections each continuing to corresponding one of sides of the twisted section by twisting two electric wires. The twisted wire producing method includes:

twisting an electric wire;

performing pre-processes prior to the twisting process that includes:

chucking one ends of the two electric wires with a one end chuck part;

chucking the other ends of the two electric wires with the other end chuck part;

adding tension to the two electric wires with a tension adding part; and absorbing a wire length difference between the two electric wires using at least the other end chuck part, the wire length difference absorbing process is configured to absorb the wire length difference at a section between a boundary position between the twisted section and the terminal untwisted section and a position at which the electric wires are chucked by the other end chuck part.

Functions of the present invention having the above features will be described in detail in embodiments in the present specification, and description thereof will be omitted here.

According to the present invention described in (1), the twisted wire producing apparatus is a twisted wire producing apparatus including the wire length difference absorbing part and so on. Thus, although a variation (a wire length difference) within a dimensional tolerance within which one of the two electric wires is longer than the other is present at the two electric wires, an effect that this variation can be absorbed by the wire length difference absorbing part is exerted. As in the present invention, if the wire length difference can be absorbed, an effect that a state in which the twisted section is formed at the twisted wire can be stabilized is exerted. According to the present invention, since the wire length difference absorbing part is arranged at a position corresponding to the terminal untwisted section of the twisted wire, no hindrance is caused in forming the twisted section. As a result, an effect that the state in which the twisted section is formed can be further stabilized is exerted.

According to the present invention, since the state in which the twisted section is formed can be stabilized, an effect that a quality can be guaranteed without performing measurement or the like of an inter-wire gap and a characteristic impedance is exerted. Therefore, according to the present invention, an effect that a twisted wire producing apparatus that has high reliability of the twisted wire and can contribute to a reduction in cost can be provided is exerted.

According to the present invention described in (2), with regard to the inter-electric wire inserting part constituting the wire length difference absorbing part, an effect that a better structure can be provided is exerted.

According to the present invention described in (3), the other end chuck part is configured to further include the terminal contact part. Thus, an effect that, after the tips of the terminal fittings come into contact at the same position, the other ends of the two electric wires can be chucked by the other end chuck part, and thus it can be easy to do work regarding setting of the two electric wires is exerted.

According to the present invention described in (4), the twisted wire producing method is a method suitable to produce the twisted wire using a twisted wire producing apparatus including a wire length difference absorbing part and so on. Thus, although a variation (a wire length difference) within a dimensional tolerance within which one of the two electric wires is longer than the other is present at the two electric wires, an effect that this variation can be absorbed by the wire length difference absorbing part is exerted. As in the present invention, if the wire length difference can be absorbed, an effect that a state in which the twisted section is formed at the twisted wire can be stabilized is exerted. According to the present invention, since the wire length difference absorbing part is arranged at a position corresponding to the terminal untwisted section of the twisted wire, no hindrance is caused in forming the twisted section. As a result, an effect that the state in which the twisted section is formed can be further stabilized is exerted.

According to the present invention, since the state in which the twisted section is formed can be stabilized, an effect that a quality can be guaranteed without performing measurement or the like of an inter-wire gap and a characteristic impedance is exerted. Therefore, according to the present invention, an effect that a twisted wire producing method that has high reliability of the twisted wire and can contribute to a reduction in cost can be provided is exerted.

BRIEF DESCRIPTION OF DRAWINGS

FIG. 3A is a view illustrating two electric wires of a state in which there is no wire length difference.

FIG. 3B is a view illustrating two electric wires of a state in which there is a wire length difference.

FIGS. 12A and 12B are explanatory views relating to a process of hanging the middles of the electric wires in a twisted wire producing method (in the case of a long twisted wire) of the present invention.

FIGS. 14A and 14B are explanatory views relating to a second electric wire hoisting process, a process of chucking the other ends of the electric wires, and a tension adding process in the twisted wire producing method of the present invention.

FIGS. 15A and 15B are explanatory views relating to an electric wire twisting process (twisting of the other end side) in the twisted wire producing method of the present invention.

FIGS. 16A and 16B are explanatory views relating to an electric wire twisting process (twisting toward a middle untwisted section) in the twisted wire producing method of the present invention.

FIGS. 20A to 20C are explanatory views relating to a process of chucking one ends of the electric wires, a third electric wire hoisting process, a process of chucking the other ends of the electric wires, and a tension adding process in the twisted wire producing method of the present invention.

FIGS. 21A to 21C are explanatory views relating to an electric wire twisting process (twisting of the other end side and movement of a middle untwisted section) in the twisted wire producing method of the present invention.

FIGS. 22A to 22C are explanatory views relating to an electric wire twisting process (twisting toward the middle untwisted section and twisting of one end side) in the twisted wire producing method of the present invention.

DETAILED DESCRIPTION OF EMBODIMENTS

A twisted wire producing apparatus is an apparatus for producing a twisted wire having a twisted section and terminal untwisted sections each continuing to corresponding one of sides of the twisted section by twisting two electric wires, and includes: an electric wire twisting unit having a wire length difference absorbing part; a controller for controlling the electric wire twisting unit; and a tension adding part for adding tension to the two electric wires. The wire length difference absorbing part is formed at a portion that is arranged at a position corresponding to the terminal untwisted section of the twisted wire and absorbs a wire length difference occurring at the two electric wires. Meanwhile, a twisted wire producing method is a method that includes a process of performing absorption of the wire length difference with the wire length difference absorbing part before twisting.

Embodiment

Figure 1:
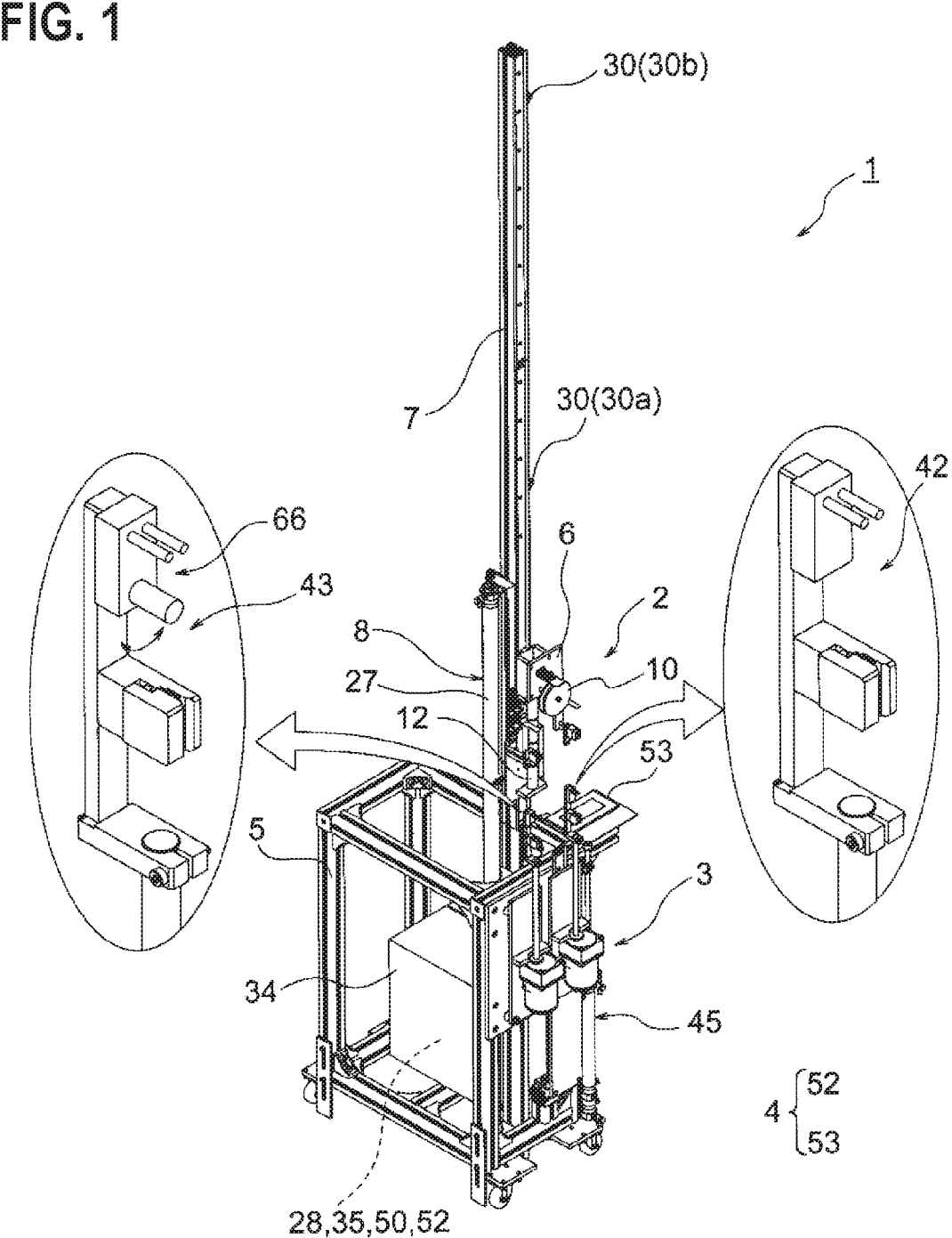
FIG. 1 is a perspective view of a twisted wire producing apparatus of the present invention.
Figure 2A:
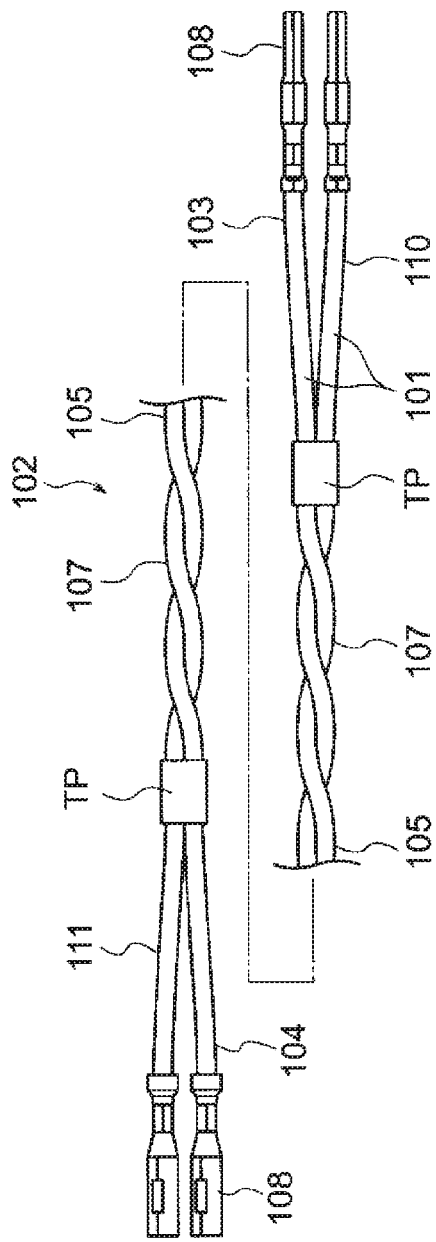
FIG. 2A is a view illustrating a twisted wire of a state in which there is no wire length difference.
Figure 2B:
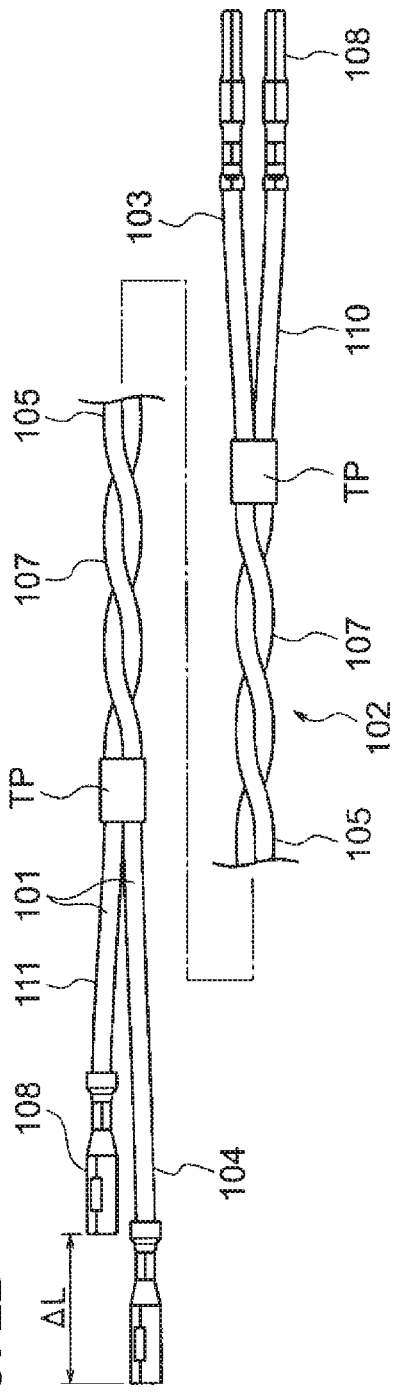
FIG. 2B is a view illustrating a twisted wire of a state in which there is a wire length difference.
Figure 4:
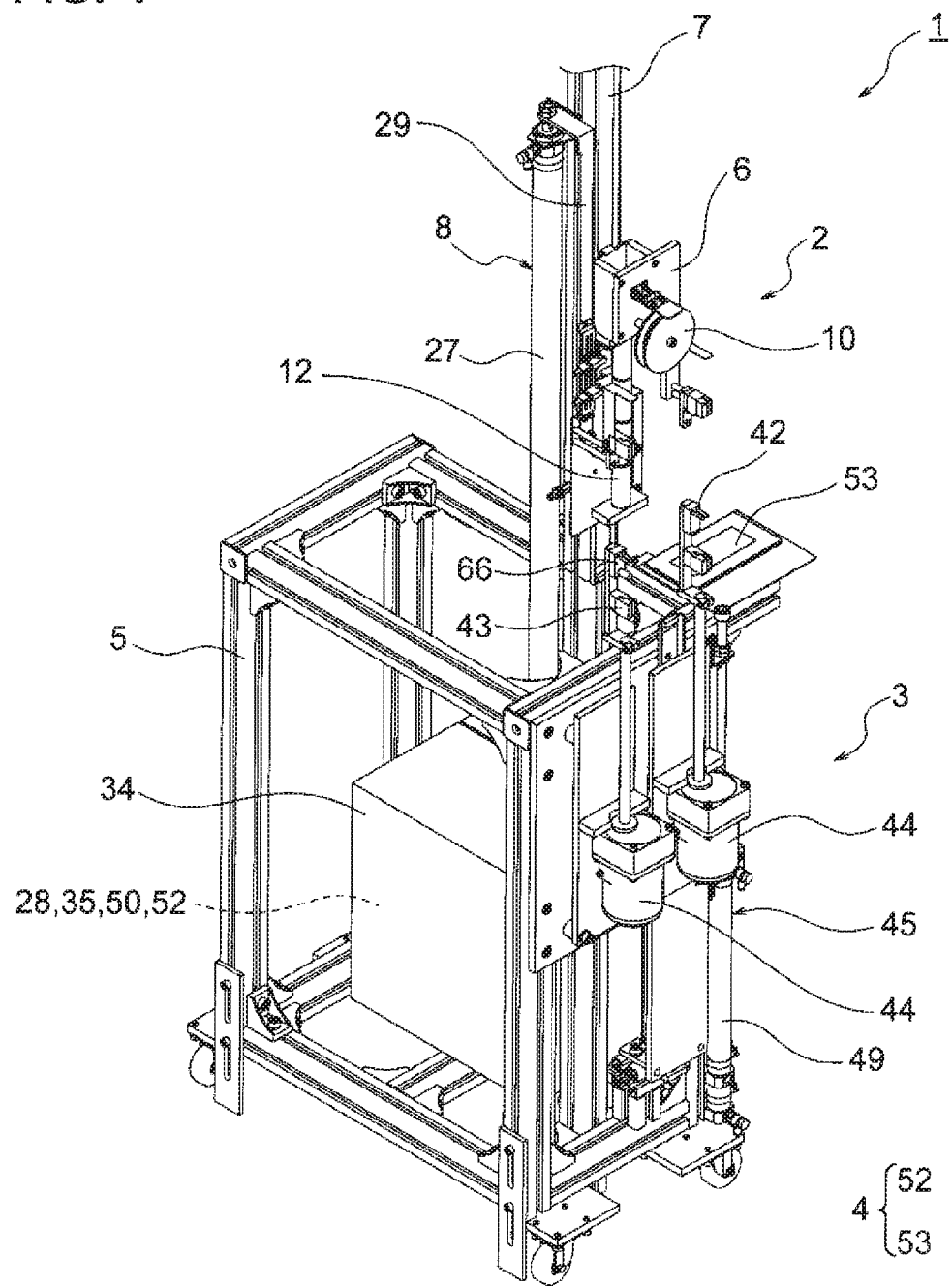
FIG. 4 is an enlarged view of a lower portion in the twisted wire producing apparatus of FIG. 1.
Figure 5:
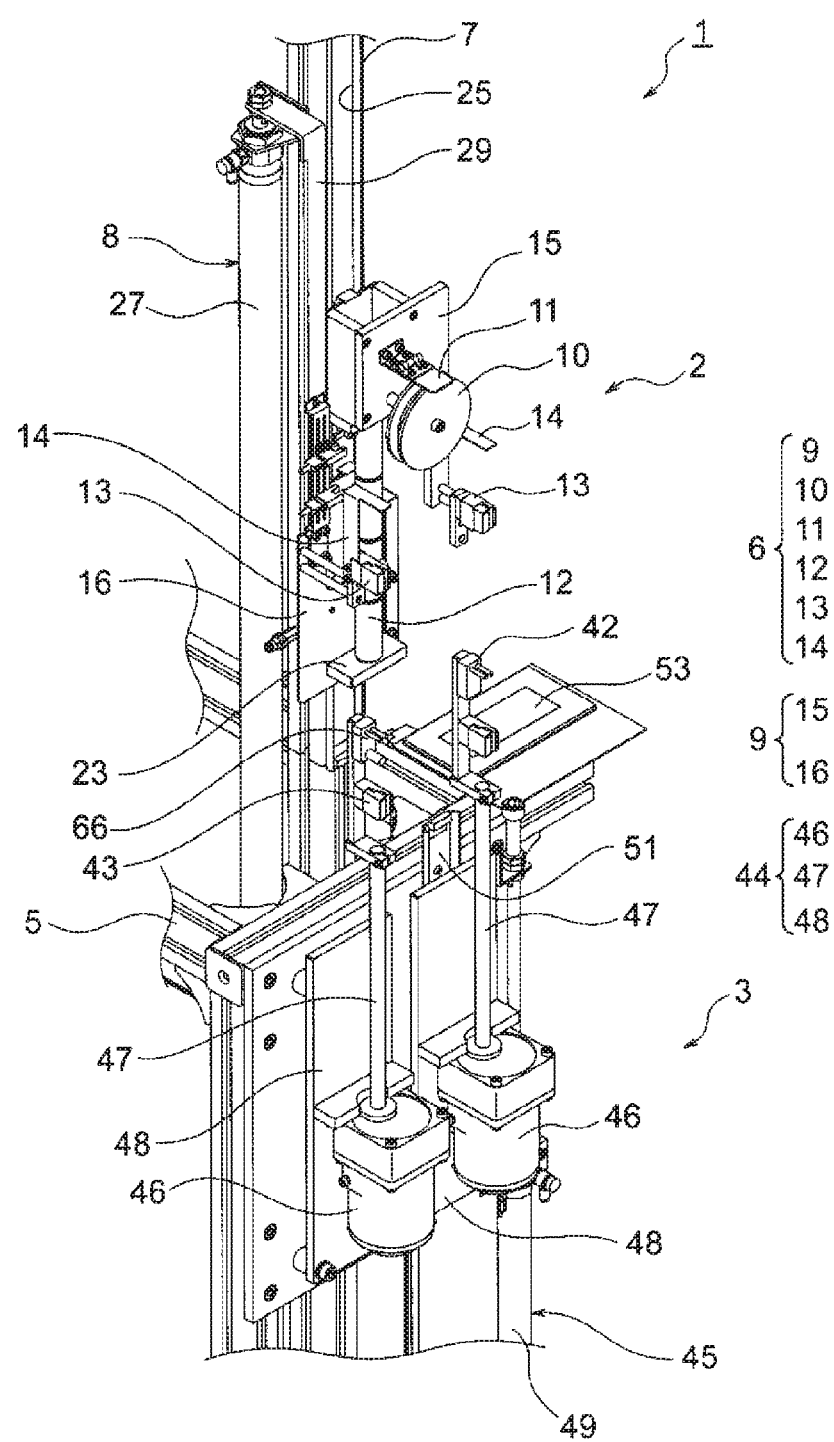
FIG. 5 is an enlarged view of key parts of FIG. 4.
Figure 6:
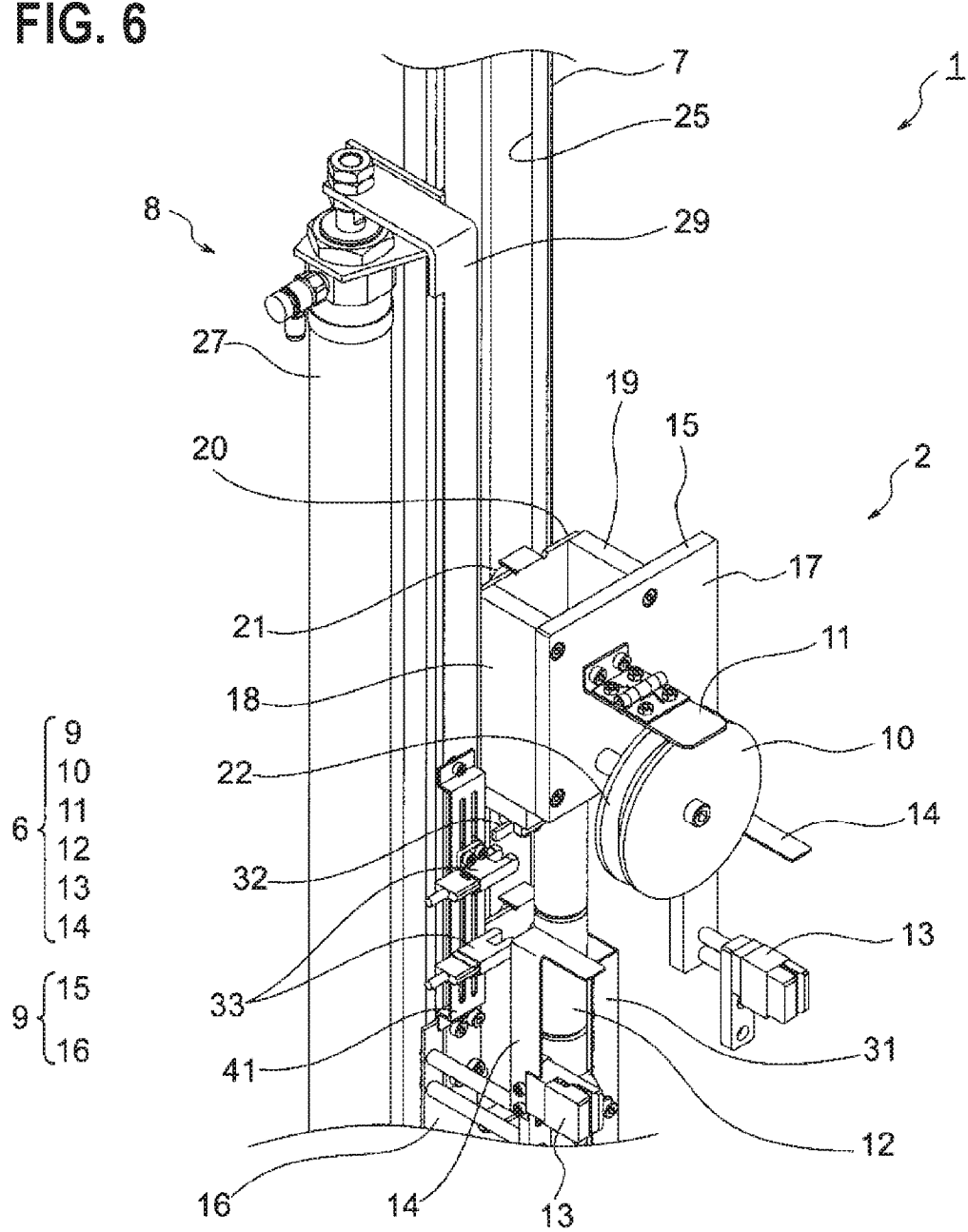
FIG. 6 is an enlarged view of an electric wire elevating unit of FIG. 5.
Figure 7:
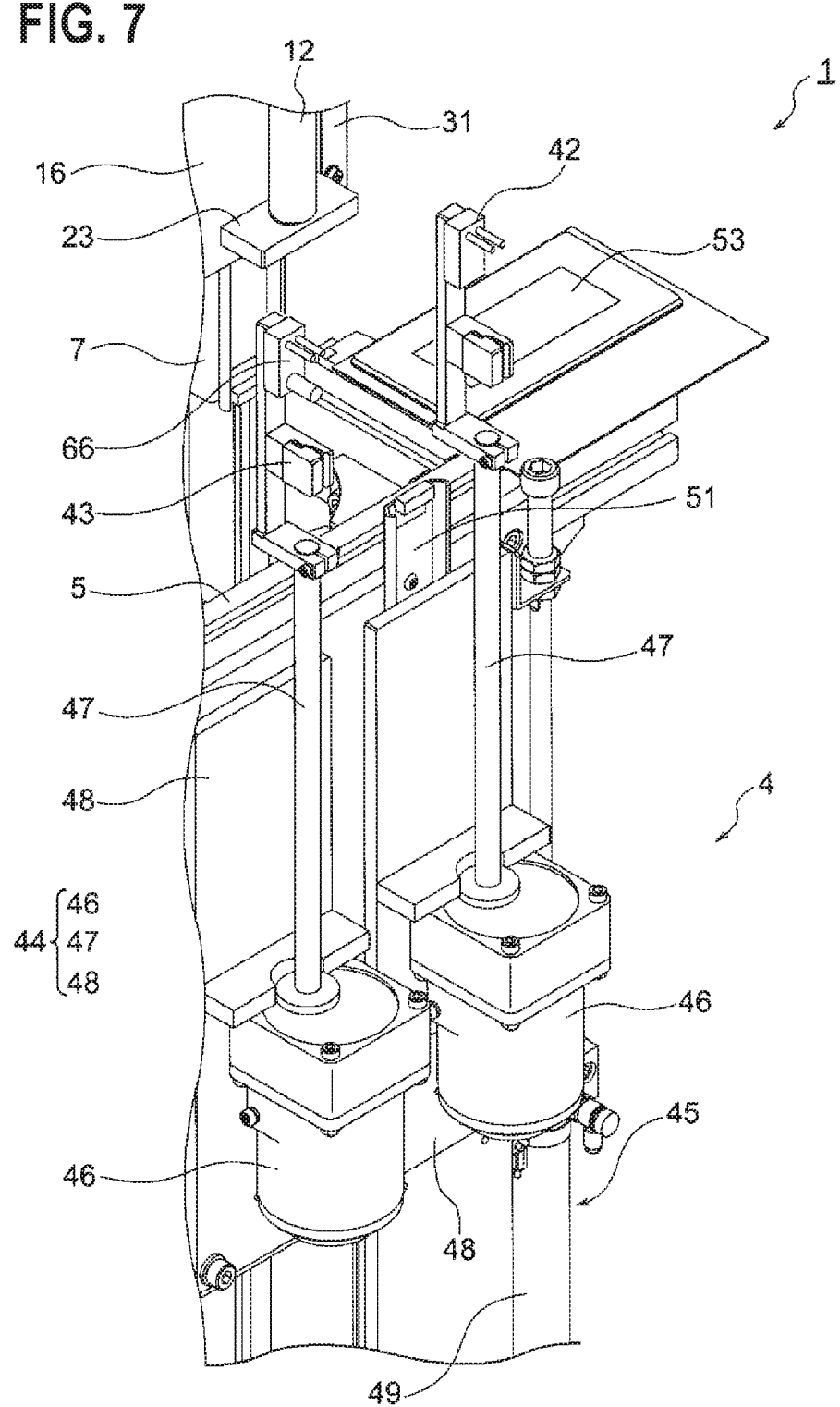
FIG. 7 is an enlarged view of an electric wire twisting unit of FIG. 5.
Figure 8:
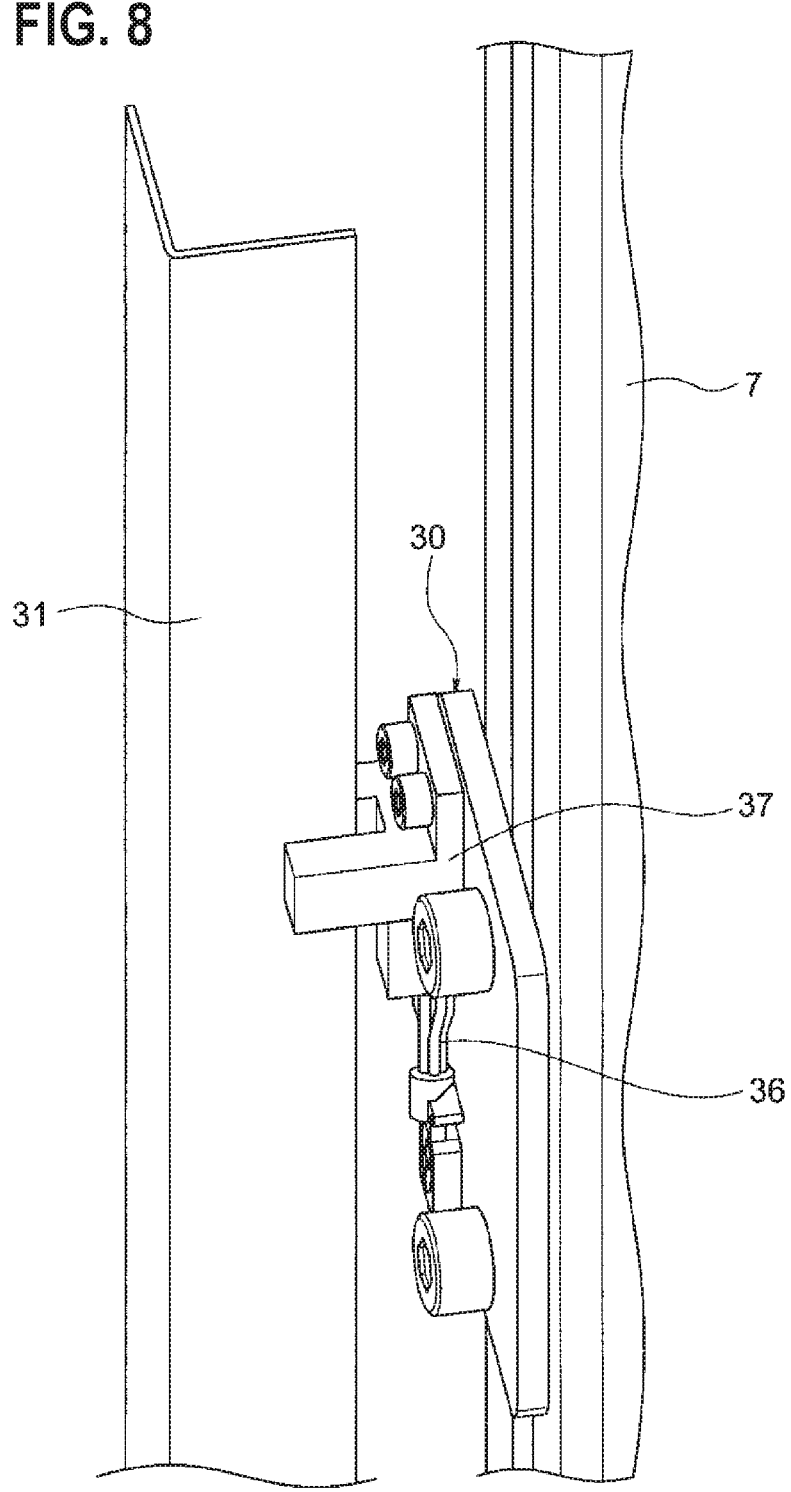
FIG. 8 is an enlarged view of a sensor and a light shielding part in the electric wire elevating unit of FIG. 1.
Figure 9:
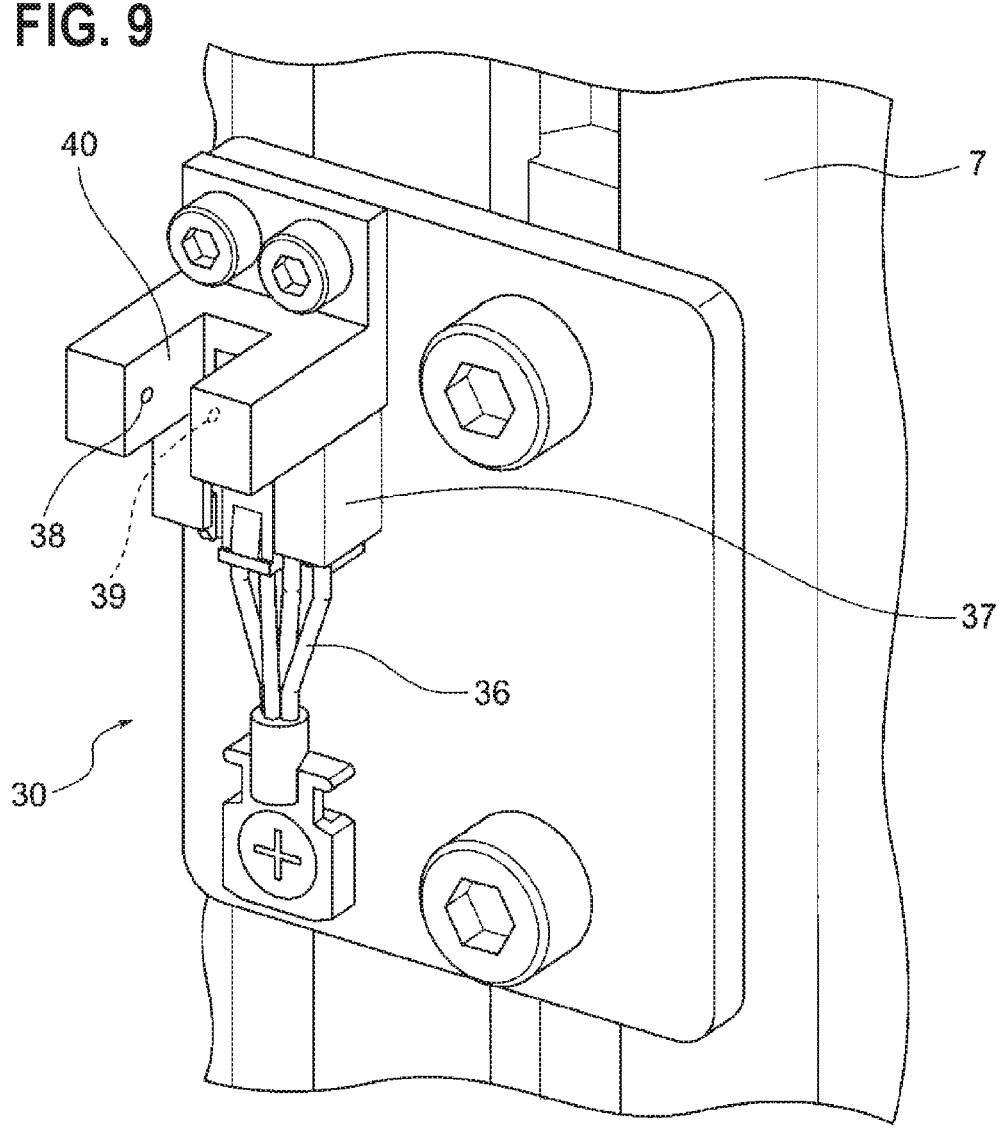
FIG. 9 is a perspective view of the sensor of FIG. 8.
Figure 10:
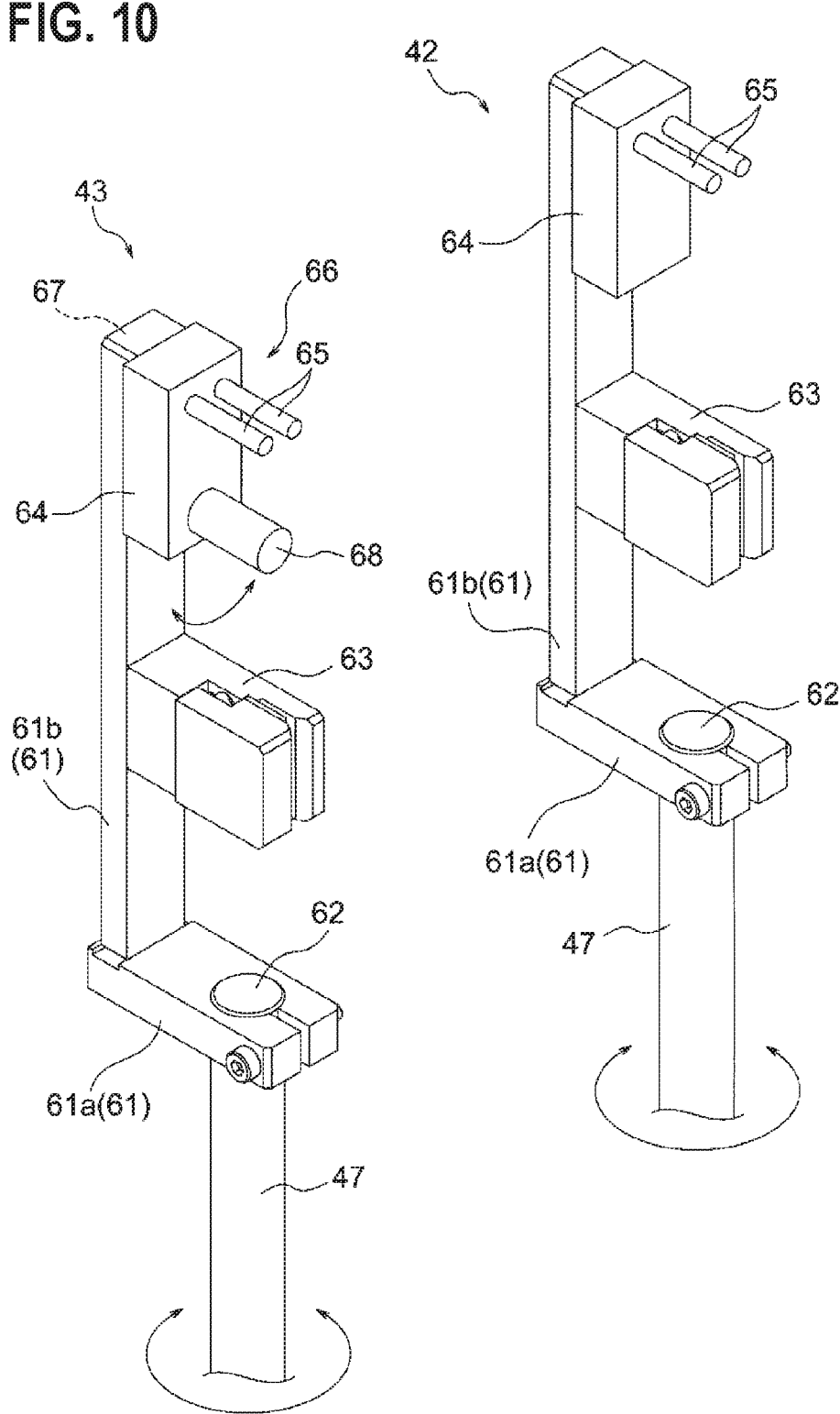
FIG. 10 is an enlarged view of a one end chuck part and the other end chuck part.
Figure 11:
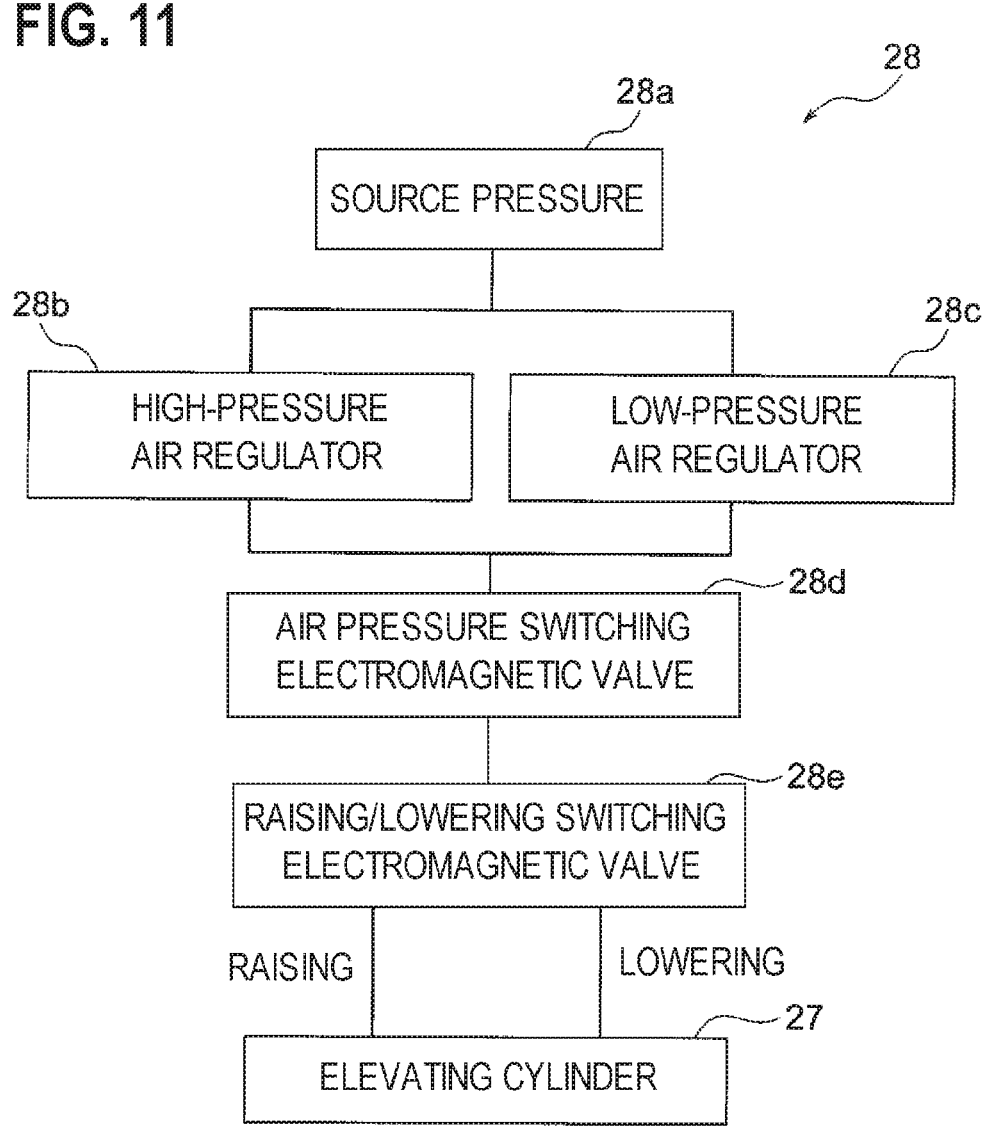
FIG. 11 is an explanatory view relating to an operation of the electric wire elevating unit of FIG. 1.

Hereinafter, an embodiment will be described with reference to the drawings. FIG. 1 is a perspective view of a twisted wire producing apparatus of the present invention. FIGS. 2A and 2B are views illustrating a twisted wire, and FIGS. 3A and 3B are views illustrating two electric wires. FIG. 4 is an enlarged view of a lower portion in the twisted wire producing apparatus of FIG. 1, and FIG. 5 is an enlarged view of key parts of FIG. 4. FIG. 6 is an enlarged view of an electric wire elevating unit of FIG. 5, and FIG. 7 is an enlarged view of an electric wire twisting unit of FIG. 5. FIG. 8 is an enlarged view of a sensor and a light shielding part in the electric wire elevating unit of FIG. 1, and FIG. 9 is a perspective view of the sensor of FIG. 8. FIG. 10 is an enlarged view of a one end chuck part and the other end chuck part, and FIG. 11 is an explanatory view relating to an operation of the electric wire elevating unit of FIG. 1.

Figure 24:
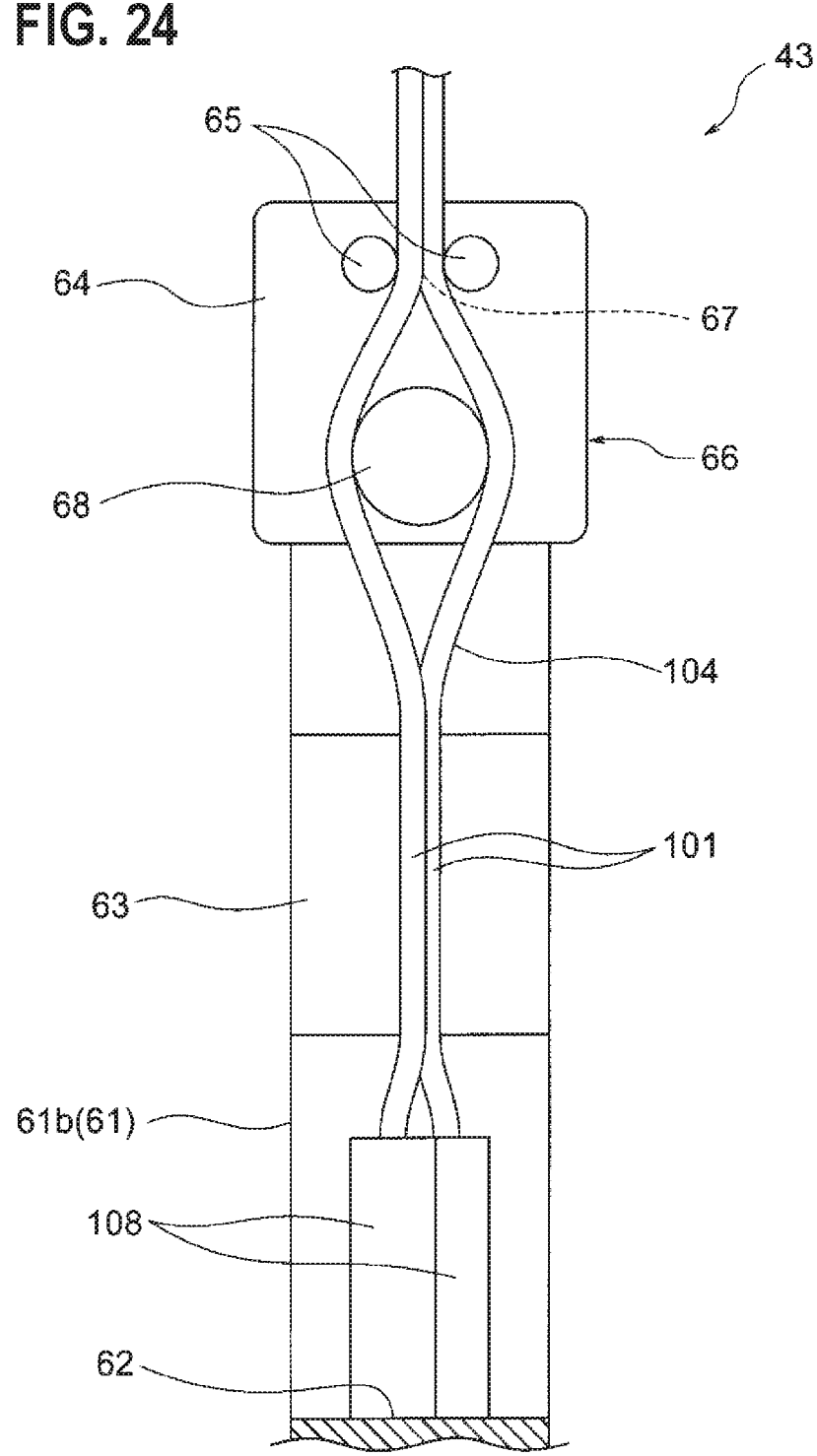
FIG. 24 is an explanatory view relating to a process of chucking the other ends of the electric wires (a state in which there is a wire length difference).
Figure 25:
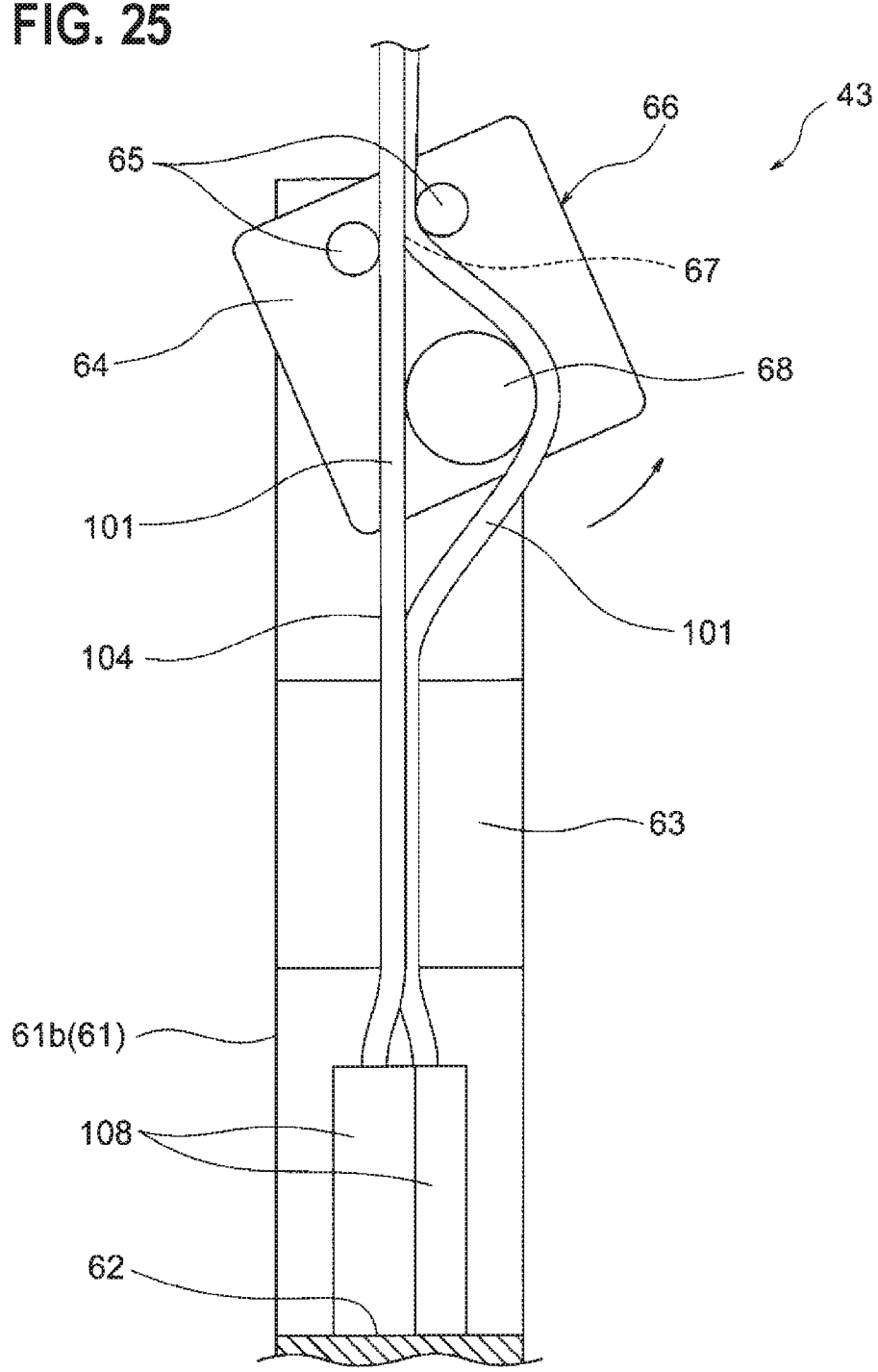
FIG. 25 is an explanatory view relating to a tension adding process (a state in which there is a wire length difference).
Figure 26:
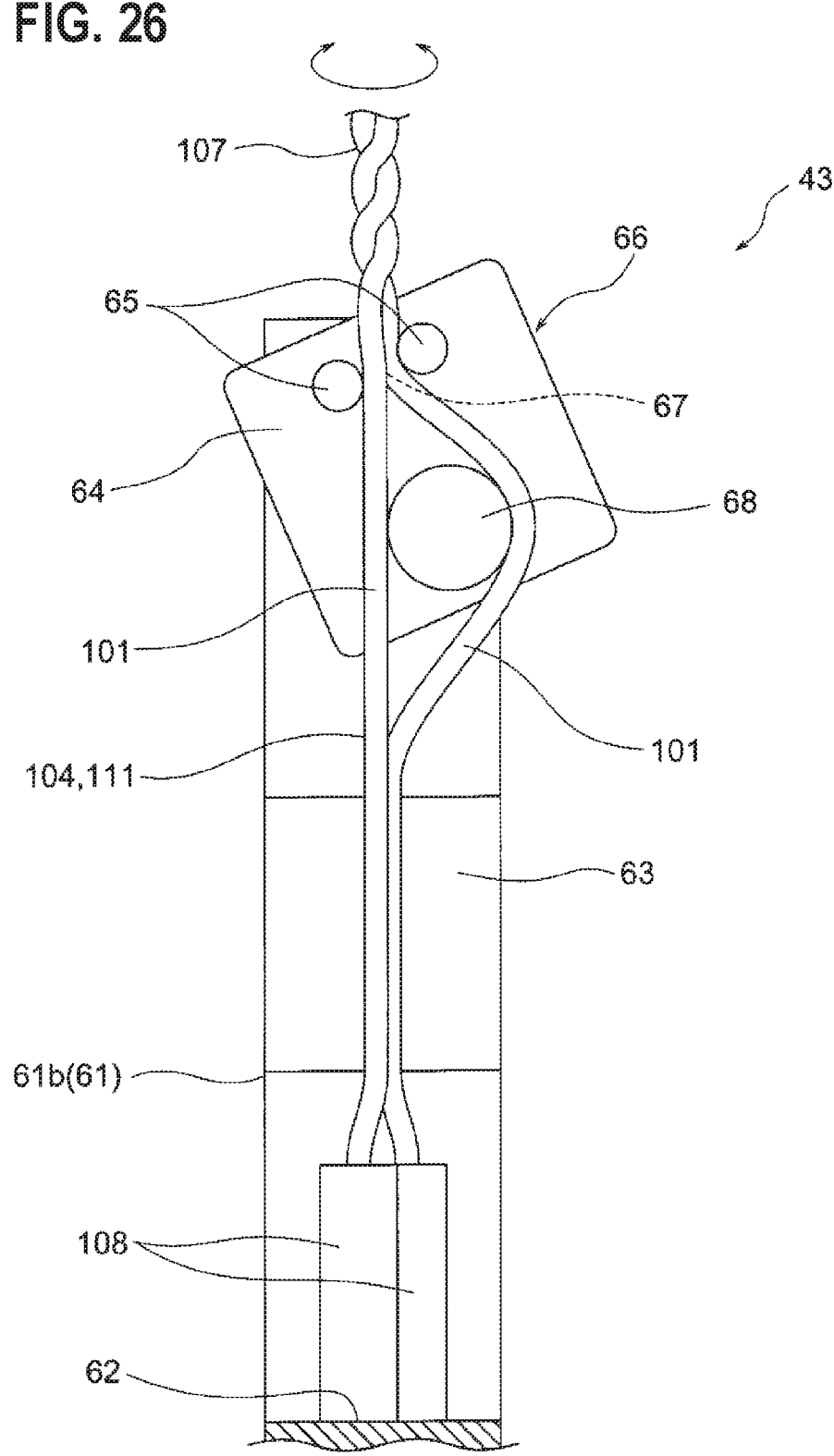
FIG. 26 is an explanatory view relating to an electric wire twisting process (a state in which there is a wire length difference).
Figure 27:
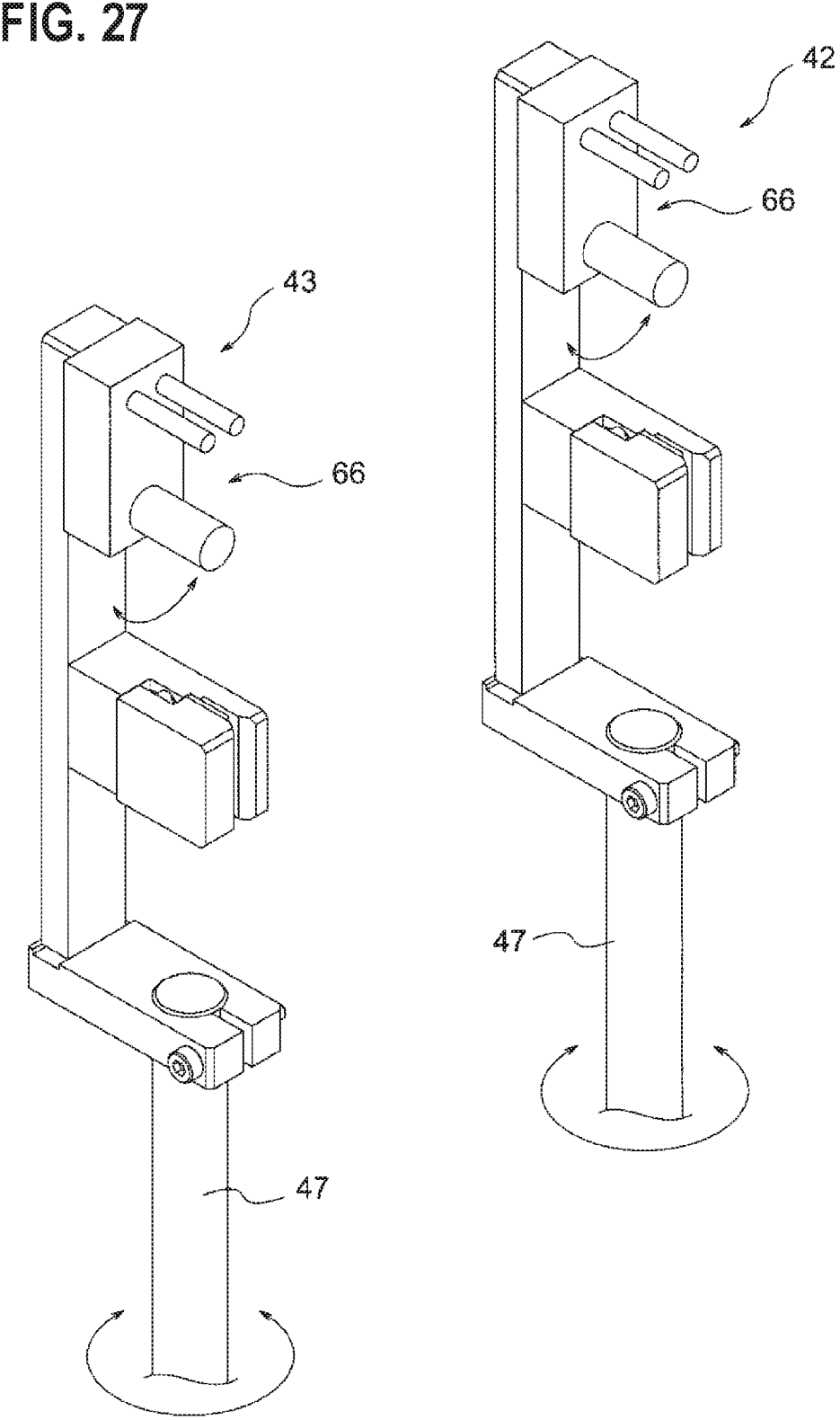
FIG. 27 is an enlarged view of a one end chuck part becoming another example.

FIGS. 12A to 18B are explanatory views relating to each process of a twisted wire producing method (in the case of a long twisted wire) of the present invention, and FIGS. 19A to 23B are explanatory views relating to each process of a twisted wire producing method (in the case of a short twisted wire) of the present invention. FIGS. 24 to 26 are explanatory views relating to each process of a twisted wire producing method (in the case of a twisted wire having a wire length difference) of the present invention, and FIG. 27 is an enlarged view of the one end chuck part becoming another example.

Configuration of Twisted Wire Producing Apparatus 1

In FIG. 1, a twisted wire producing apparatus 1 is an apparatus for producing a twisted wire 102 (see FIGS. 2A and 2B), and includes an electric wire elevating unit 2, an electric wire twisting unit 3, a controller 4 for controlling the entire apparatus, and a frame 5 for installing each of these units at a prescribed position of the apparatus. The twisted wire producing apparatus 1 also includes a wire length difference absorbing part 66, a tension adding part 12, etc. that are characteristic parts of the present invention. Hereinafter, each configuration will be described.

Twisted Wire 102 and Two Electric Wires 101

Figure 28A:
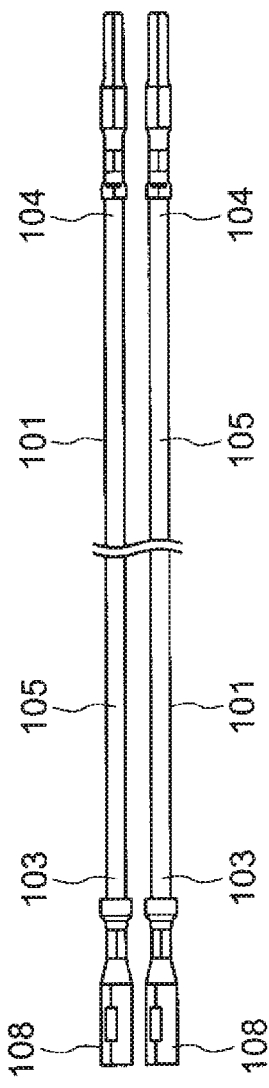
FIG. 28A is an explanatory view relating to a state in which the two electric wires are lined up according to the related-art example
Figure 28B:
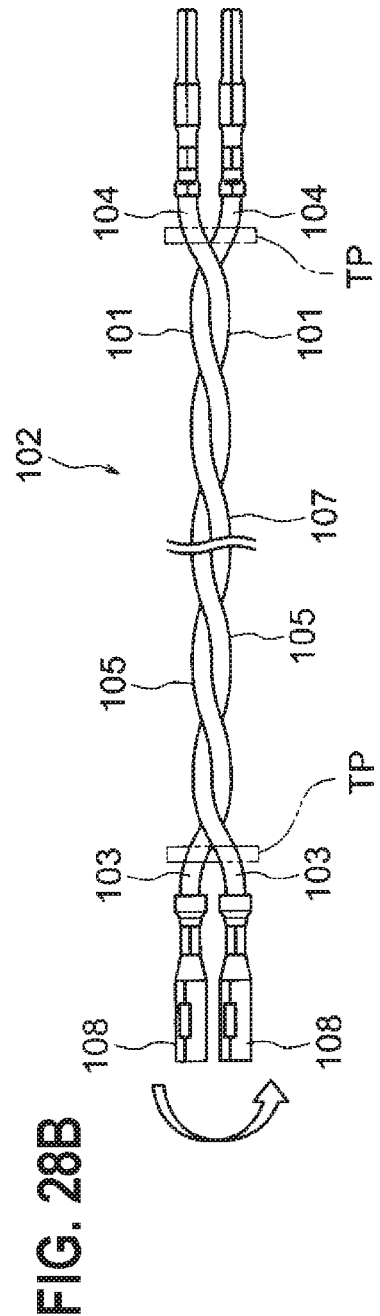
FIG. 28B is an explanatory view illustrating a twisted wire.
Figure 29:
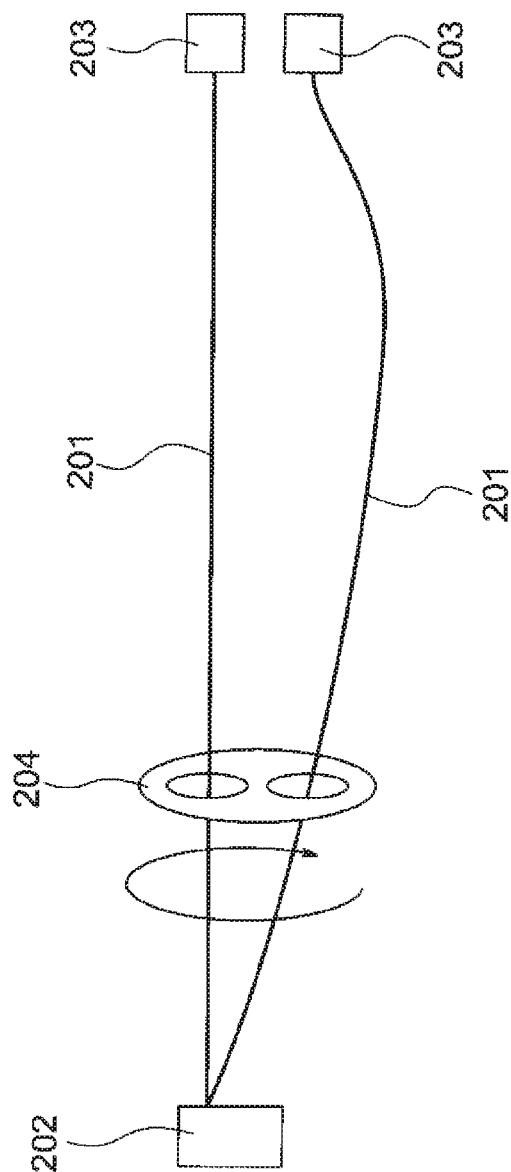
FIG. 29 is a view relating to description of a conventional example in a state in which the wire length difference occurs at the two electric wires.

In FIGS. 2A, 2B, 3A, and 3B, the twisted wire 102 has the same configuration as a twisted wire 102 (an example of the related art) of FIGS. 28A and 28B, and is produced by twisting two electric wires 101.

In the twisted wire 102 and the two electric wires 101, a reference numeral 103 indicates one end, a reference numeral 104 indicates the other end, a reference numeral 105 indicates a middle, a reference numeral 107 indicates a twisted section, a reference numeral 108 indicates a terminal fitting, a reference numeral 110 indicates a terminal untwisted section close to one end, a reference numeral 111 indicates a terminal untwisted section close to the other end, and a reference numeral TP indicates taping. Although will be described with reference to other drawings, a U turn section 106 (see FIGS. 12A and 12B) and a middle untwisted section 109 (see FIGS. 16A and 16B) occur in a producing process.

In FIGS. 2A, 2B, 3A, and 3B, it is illustrated that a variation within a dimensional tolerance occurs and does not occur in the twisted wire 102 and the two electric wires 101. In other words, it is illustrated that one electric wire 101 has such a wire length difference as to be longer than the other electric wire 101 by ΔL and does not have. The wire length difference ΔL occurs at the side of the other end 104, but this is an example. That is, the wire length difference ΔL may occur at the side of the one end 103, or both the one end 103 and the other end 104 (properly set depending on the dimensional tolerance).

In the present invention, even when the variation (the wire length difference ΔL) within the dimensional tolerance regarding production of the twisted wire 102 is present in the two electric wires 101, the long electric wire 101 is devised not to be in a slightly loose state at a position of the twisted section 107. This devisal is a feature of the present invention, and comes to be understood in the following description.

Electric Wire Elevating Unit 2

In FIGS. 1, 4, 5, and 6, the electric wire elevating unit 2 is provided as a unit for hoisting the two electric wires 101 (see FIGS. 3A and 3B) and performing a descent after the twisted wire 102 (see FIGS. 2A, 2B, 18A, and 18B) is produced. This electric wire elevating unit 2 includes an elevating part 6 that acts as a part for hoisting the two electric wires 101, an elevating guide part 7 for guiding the elevating part 6 in a vertical direction, and a high/low-speed elevating unit 8 for elevating the elevating part 6 at a high speed or at a low speed.

Elevating Part 6

In FIGS. 5 and 6, the elevating part 6 includes a main body 9, an electric wire hanging part 10 provided for the main body 9, and an electric wire pressing part 11 and a tension adding part 12 that are equally provided for the main body 9. In addition, the elevating part 6 of the present embodiment includes a pair of option chuck parts 13 and a pair of electric wire guards 14 that are provided for the main body 9.

Main Body 9 of Elevating Part

In FIG. 5, the main body 9 of the present embodiment is made up of two members up and down. To be specific, the main body 9 is made up of an upper main body 15 and a lower main body 16. The upper main body 15 and the lower main body 16 are coupled via the tension adding part 12. The tension adding part 12 will be described below, but it is a member having elasticity in a vertical direction. The tension adding part 12 is one of characteristic parts of the present invention, and is provided to add tension (add a tensile force) to the two electric wires 101.

The upper main body 15 and the lower main body 16 are formed such that the lower main body 16 is raised and lowered by the high/low-speed elevating unit 8 (to be described below) or the upper main body 15 is also guided in a vertical direction by the elevating guide part 7 (to be described below) in association with the raising/lowering.

Upper Main Body 15

In FIG. 6, the upper main body 15 has a front wall 17, a left wall 18, a right wall 19, and a rear wall 20, and is formed in an approximately tubular shape. The electric wire hanging part 10 and the electric wire pressing part 11 are provided on a front surface of the front wall 17. The front wall 17 is formed in an asymmetrical shape in which a right side thereof further extends in a rightward direction. A band plate-like portion protruding downward is formed at the rightward extending portion. The right option chuck part of the pair of option chuck parts 13 and the right electric wire guard of the pair of electric wire guards 14 are provided at the band plate-like portion.

The left wall 18 and the right wall 19 are fixed to a rear surface of the front wall 17 at a prescribed interval. Alight shielding segment 32 (to be described below) is provided below the left wall 18. The light shielding segment 32 is disposed to correspond to positions of a pair of sensors 33 (to be described below). The light shielding segment 32 and the sensors 33 are provided as one configuration of the high/low-speed elevating unit 8 (to be described below) to detect an applied state of tension when the two electric wires 101 are hoisted (see FIGS. 14A and 14B).

The rear wall 20 is fixed to the left wall 18 and the right wall 19. A guide convex part 21, which is inserted into a guide concave part 25 of the elevating guide part 7 (to be described below) and is guided in a vertical direction, is provided for this rear wall 20. The guide convex part 21 is formed at a convex part.

Electric Wire Hanging Part 10

In FIGS. 6, 12A, and 12B, the electric wire hanging part 10 is formed as a part for hanging each of the U turn sections 106 formed in the middles 105 of the two electric wires 101. In the present embodiment, the electric wire hanging part 10 is formed in the shape of a circular roller, and is formed to be rotatable. A concave part 22 is formed round this electric wire hanging part 10. The concave part 22 is formed as a part for making the U turn sections 106 difficult to drop out.

Electric Wire Pressing Part 11

In FIG. 6, the electric wire pressing part 11 is provided as a part for pressing each of the U turn sections 106 from above after the U turn sections 106 (see FIGS. 12A and 12B) are hung not to intersect each other at the concave part 22 of the electric wire hanging part 10 or covering the concave part 22. The electric wire pressing part 11 is provided as a part for preventing dropout and looseness of the electric wires during hoisting.

Lower Main Body 16

In FIGS. 5 and 6, the lower main body 16 is formed at a tabular part. A left upper portion of the lower main body 16 is coupled to a coupling arm 29 of the high/low-speed elevating unit 8 (to be described below). The lower main body 16 is formed to be able to be raised and lowered by the coupling arm 29. The lower main body 16 is guided along the elevating guide part 7 (to be described below) in a vertical direction. A placing part 23, alight shielding part 31 (to be described below), the left option chuck part of the pair of option chuck parts 13, and the left electric wire guard of the pair of electric wire guards 14 are provided for this lower main body 16. The light shielding part 31 is disposed at positions corresponding to the sensors 30 (to be described below). The light shielding part 31 and the sensors 30 are provided as one configuration of the high/low-speed elevating unit 8 (to be described below).

Placing Part 23

In FIG. 5, the placing part 23 is formed at a flaky portion that is laterally long and protrudes forward. The placing part 23 is formed to be able to place and fix a lower end side of the tension adding part 12 on an upper surface thereof.

Tension Adding Part 12

In FIGS. 5 and 6, the tension adding part 12 is a member having a spring contracted downward when a load is applied, and is formed such that a lower end side thereof is fixed to the placing part 23 and an upper end thereof can be assembled to the upper main body 15. As described above, the tension adding part 12 is one of the characteristic parts of the present invention, and is provided as a part that can apply a "restoring force" generated when contracted downward to the two electric wires 101.

Pair of Option Chuck Parts

In FIGS. 5 and 6, the pair of option chuck parts 13 are used when short electric wires that are not illustrated in the two drawings are twisted. The pair of option chuck parts 13 are formed as parts that can chuck upper ends of the short electric wires. The pair of option chuck parts 13 are disposed at positions directly above one end and other end chuck parts 42 and 43 of the electric wire twisting unit 3 (to be described below). The pair of option chuck parts 13 are arranged at positions at which the short electric wires can be hoisted at straight upper sides (not in an U-turned state).

If there is an apparatus that does not require the twisting of the short electric wires, the pair of option chuck parts 13 may not be provided (the pair of electric wire guards 14 to be described below may not be provided as well).

Pair of Electric Wire Guards 14

In FIGS. 5 and 6, the pair of electric wire guards 14 are provided such that, when the twisted wire 102 (see FIGS. 2A and 2B) is produced, the two electric wires 101 (see FIGS. 12A to 18B) are not in contact with the pair of option chuck parts 13.

Elevating Guide Part 7

In FIGS. 1 and 4 to 8, the elevating guide part 7 is a rod-like member that extends straight in a vertical direction, and is formed with a fixture for the frame 5 at a lower end side thereof. The elevating guide part 7 is formed to have a height dimension that is equal to or more than at least half of the full length of the produced twisted wire 102 (see FIGS. 2A, 2B, 18A, and 18B). The elevating guide part 7 is formed to be able to guide (raise or lower) the upper main body 15 in a vertical direction. To be specific, the elevating guide part 7 is formed in a shape having the recessed (groove-like) guide concave part 25. The guide concave part 25 is disposed and formed on the front surface of the elevating guide part 7.

The sensors 30 (to be described below) are provided on a right surface of the elevating guide part 7. The sensors 30 are adapted to detect a raised position and a lowered position of the elevating part 6, and are arranged in a plurality of places at a prescribed interval.

High/Low-Speed Elevating Unit 8

In FIGS. 1 and 4 to 6, as described above, the high/low-speed elevating unit 8 is provided for the twisted wire producing apparatus 1 to raise/lower the elevating part 6 at a high or low speed. As regards the twisted wire producing apparatus 1, it is characterized in that it includes the high/low-speed elevating unit 8, and thus is not configured to merely hoist the two electric wires 101 (see FIGS. 12A, 12B, 18A, and 18B). The high/low-speed elevating unit 8 is controlled by the controller 4 (to be described below).

The high/low-speed elevating unit 8 of the present embodiment is configured to be able to be raised and lowered using an air cylinder (it is not limited thereto. For example, the high/low-speed elevating unit 8 may be configured to be raised and lowered by a motor or the like. In the present embodiment, the high/low-speed elevating unit 8 aims at requiring no cost). To be specific, the high/low-speed elevating unit 8 includes an elevating cylinder 27, an air feeder 28 for feeding air to this elevating cylinder 27, a coupling arm 29 interposed between the elevating cylinder 27 and the elevating part 6, the sensors 30 provided in a plurality of places of the elevating guide part 7, the light shielding part 31 provided for the elevating part 6, the light shielding segment 32 provided for the elevating part 6, and sensors 33 provided for the coupling arm 29.

Elevating Cylinder 27

In FIGS. 1 and 4 to 6, the elevating cylinder 27 is a well-known air cylinder, and adopts a cylinder having a length required to produce the twisted wire 102 (see FIGS. 12A, 12B, 18A, and 18B). In the present embodiment, the elevating cylinder 27 adopts a long cylinder, and is arranged in a state in which it extends parallel to the elevating guide part 7 in a vertical direction.

Air Feeder 28

In FIGS. 1 and 4, the air feeder 28 is arranged in a box 34 fixed to the frame 5 as an example. The air feeder 28 is configured to have, for instance, a plurality of parts illustrated in FIG. 11.

In FIG. 11, to be specific, the air feeder 28 has a source pressure generator part 28a for generating a "source pressure," a high-pressure air regulator part 28b that is connected to the source pressure generator part 28a and functions as a "high-pressure air regulator," a low-pressure air regulator part 28c that is connected to the source pressure generator part 28a and functions as a "low-pressure air regulator," an air pressure switching electromagnetic valve part 28d that is connected to the high- and low-pressure air regulator parts 28b and 28c and functions as an "air pressure switching electromagnetic valve." and a raising/lowering switching electromagnetic valve part 28e that is connected to the air pressure switching electromagnetic valve part 28d and functions as a "raising/lowering switching electromagnetic valve." That is, the air feeder 28 can be configured to raise/lower the elevating cylinder 27 with high-pressure air or low-pressure air.

As an example, a power supply 35 for supplying power, a main body 52 of the controller 4 (to be described below), etc. are also arranged in the box 34 in which the air feeder 28 as described above is arranged.

Coupling Arm 29

In FIGS. 5 and 6, the coupling arm 29 is an L-shaped band plate member, and one end thereof is fixed to a telescopic part of the elevating cylinder 27. The other end of the coupling arm 29 is fixed to the lower main body 16 of the elevating part 6. This coupling arm 29 is formed to be able to raise/lower the lower main body 16 along with expansion and contraction (vertical movement) of the elevating cylinder 27.

When the lower main body 16 is raised and lowered, the upper main body 15 is also raised and lowered, and therefore the electric wire hanging part 10 provided for the upper main body 15 is also raised and lowered. Since the electric wire hanging part 10 is a part for hanging the U turn sections 106 (see FIGS. 12A and 12B) occurring at the two electric wires 101 (see FIGS. 12A and 12B), when the coupling arm 29 is raised, the two electric wires 101 are hoisted.

Sensors 30

In FIG. 1, the sensors 30 are provided in a plurality of places of the right surface of the elevating guide part 7 at a prescribed interval. These sensors 30 are provided to detect a position of the elevating part 6.

In FIGS. 8 and 9, a sensor main body 37 connected to the controller 4 (see FIG. 4) (to be described below) via signal lines 36 is provided for each of the sensors 30. A light emitting part 38 emitting light and a light receiving part 39 receiving the light from the light emitting part 38 are provided for the sensor main body 37. A space 40 through which the light shielding part 31 passes is formed between the light emitting part 38 and the light receiving part 39. A well-known photosensor is adopted as the sensor 30 of the present embodiment.

Light Shielding Part 31

In FIGS. 6 and 8, like the sensors 30, the light shielding part 31 is provided to detect the position of the elevating part 6. The light shielding part 31 is formed at a plate-like portion that can block the light from the light emitting part 38 in the sensor 30. The light shielding part 31 is disposed to pass through the space 40 of the sensor main body 37 when the elevating part 6 is raised and lowered.

Light Shielding Segment 32

In FIG. 6, the light shielding segment 32 is provided below the left wall 18 of the upper main body 15 in the elevating part 6. The light shielding segment 32 is provided to detect a position of the upper main body 15 that is spring-biased by the tension adding part 12. When the light shielding segment 32 is located between the pair of upper and lower sensors 33, it is determined in the present embodiment that adequate tension is applied to the two electric wires 101 (see FIGS. 12A, 12B, 18A, and 18B).

Sensors 33

In FIG. 6, the sensors 33 are arranged on the coupling arm 29 via a mounting part 41. The sensors 33 are arranged to vertically become a pair at a prescribed interval. A light emitting part emitting light and a light receiving part receiving the light from the light emitting part are provided for each of the pair of sensors 33. A space through which the light shielding segment 32 passes is formed in each of the sensors 33. A well-known photosensor is adopted as the sensor 33 of the present embodiment.

Electric Wire Twisting Unit 3

In FIGS. 1, 4 and 5, the electric wire twisting unit 3 is provided to be arranged parallel to the electric wire elevating unit 2 and to chuck and twist the two electric wires 101 (see FIGS. 3A, 3B, and 12A to 18B). This electric wire twisting unit 3 includes the one end chuck part 42, the other end chuck part 43, same-direction rotating parts (chuck rotating parts) 44, and chuck-vertical position changing unit 45.

One End Chuck Part 42 and Other End Chuck Part 43

In FIGS. 5 and 7, the one end chuck part 42 is configured to be able to removably chuck one ends 103 of the two electric wires 101 (see FIGS. 3A, 3B, and 12A to 18B). Likewise, the other end chuck part 43 is also configured to be able to removably chuck the other ends 104 of the two electric wires 101. The one end chuck part 42 and the other end chuck part 43 have a similar configuration and structure as illustrated. However, in the present embodiment, they are different in that a wire length difference absorbing part 66 that is one of the characteristic parts of the present invention is provided for the other end chuck part 43 (they are not limited thereto. That is, both have the same configuration and structure as illustrated in FIG. 27.) Hereinafter, the one end chuck part 42 and the other end chuck part 43 will be described in detail with reference to FIG. 10.

Details of One End Chuck Part 42

In FIG. 10, the one end chuck part 42 includes a base 61, a terminal contact part 62, a chuck main body 63, a block-shaped part 64, and twist prevention parts 65. As described above, the one end chuck part 42 of this configuration is configured to chuck the one ends 103 of the two electric wires 101 (see FIGS. 3A and 3B), and to be able to form the terminal untwisted section 110 of the one end side of the twisted wire 102 (see FIGS. 2A and 2B) after being twisted.

The base 61 has a first base 61*a*, one end of which is mounted on a rotary shaft 47 (to be described below) of the same-direction rotating parts 44 (see FIG. 7), and a second base 61*b* that is connected to the other end of the first base 61*a*, and the entire base 61 is formed in an L shape as illustrated. The second base 61*b* and the first base 61*a* are formed in long and short band plate shapes in the present embodiment.

The terminal contact part 62 is formed as a part that brings (can bring) tips of the terminal fittings 108 provided for the two electric wires 101 (see FIGS. 3A and 3B) into contact at the same position. That is, the terminal contact part 62 is formed as a positioning part. Since the terminal contact part 62 exposes a tip face of the rotary shaft 47 (to be described below) from the first base 61*a* in the present embodiment, the terminal contact part 62 is formed along with this tip surface.

The chuck main body 63 is a part for actually chucking the one ends 103 of the two electric wires 101 (see FIGS. 3A and 3B), and is formed to be able to removably hold the two electric wires 101 by pinching in the present embodiment. The chuck main body 63 is formed to be able to maintain the holding even in a state in which tension (a tensile force) to be described below is applied to the two electric wires 101. A configuration and structure of the chuck main body 63 are not limited to those illustrated herein. For example, the chuck main body 63 may have a configuration that combines a well-known toggle clamp, and the like.

The block-shaped part 64 is formed in a shape that becomes, for instance, a cuboid as illustrated (the shape is an example). The block-shaped part 64 is formed at a portion where a rear side thereof is fixed and integrated to a position of an upper end of the second base 61*b*. The twist prevention parts 65 are provided at the rear side of the block-shaped part 64.

The twist prevention parts 65 are arranged at a position of an upper end of the second base 61*b* via the block-shaped part 64. The twist prevention parts 65 are arranged corresponding on a boundary position between the twisted section 107 and the terminal untwisted section 110 of the one end side in the twisted wire 102 (see FIGS. 2A and 2B). As the twist prevention parts 65 of the present embodiment, a pair of pins arranged side by side are adopted. The pair of pins are arranged at such an interval as to insert the two electric wires 101 (see FIGS. 3A and 3B). The twist prevention parts 65 are not limited to the present embodiment, and may be directly arranged on the second base 61*b*.

Details of Other End Chuck Part 43

In FIG. 10, the other end chuck part 43 includes a base 61, a terminal contact part 62, a chuck main body 63, and a wire length difference absorbing part 66. The other end chuck part 43 of this configuration is configured to chuck the other ends 104 of the two electric wires 101 (see FIGS. 3A, 3B, and 24), and to be able to form the terminal untwisted section 111 of the other end side of the twisted wire 102 (see FIGS. 2A and 2B) after being twisted.

The base 61, the terminal contact part 62, and the chuck main body 63 are adopted in the same way as the one end chuck part 42. In the other end chuck part 43, the other ends 104 of the two electric wires 101 (see FIGS. 3A, 3B and 24) are chucked with regard to the chuck main body 63.

Wire Length Difference Absorbing Part 66 of Other End Chuck Part 43

In FIGS. 10 and 24, the wire length difference absorbing part 66 is one of the characteristic parts of the present invention, and includes a block-shaped part 64, a block rotary shaft part 67, twist prevention parts 65, and an inter-electric wire inserting part 68.

The block-shaped part 64 is formed in the same cuboidal shape as in the one end chuck part 42 (the shape is an example). In the other end chuck part 43, this block-shaped part 64 is mounted in a movable state as described below without being integrally fixed to the second base 61*b*. The twist prevention parts 65 are provided at a front surface side of the block-shaped part 64 at the same position as in the one end chuck part 42.

The block rotary shaft part 67 is a part for making it possible to move the inter-electric wire inserting part 68 (to be described below) in a direction perpendicular to extending directions of the two electric wires 101 (see FIGS. 3A, 3B, and 24), and is formed at a portion that makes it possible to move the block-shaped part 64 in a direction of an arrow in the drawing in the present embodiment (in other words, formed at a portion that makes movement possible in a rotational direction to swing). The movement of the block-shaped part 64 occurs when a force acts on the inter-electric wire inserting part 68 (to be described below).

The inter-electric wire inserting part 68 is formed as a part that is inserted between electric wires of the two electric wires 101 (see FIGS. 3A, 3B, and 24). In the present embodiment, the inter-electric wire inserting part 68 is formed in the shape of a pin having a circular cross section. This inter-electric wire inserting part 68 is formed as a replaceable part that can change a diameter of the pin depending on absorption of the wire length difference ΔL in the two electric wires 101. The inter-electric wire inserting part 68 is provided to protrude from a position of a lower end on a surface of the block-shaped part 64.

The inter-electric wire inserting part 68 and the twist prevention parts 65 are provided for the block-shaped part 64, and thus naturally become parts that are movable in the direction of the arrow in the figure.

The twist prevention parts 65 of the other end chuck part 43 are arranged corresponding on a boundary position between the twisted section 107 and the terminal untwisted section 111 of the other end side in the twisted wire 102 (see FIGS. 2A and 2B). As the twist prevention parts 65 of the present embodiment, a pair of pins arranged side by side are adopted. The pair of pins are arranged at such an interval as to insert the two electric wires 101 (see FIGS. 3A, 3B, and 24). The twist prevention parts 65 are not limited to the present embodiment, and may be directly arranged at the second base 61b.

Same-Direction Rotating Parts (Chuck Rotating Parts) 44

In FIGS. 5 and 7, the same-direction rotating parts 44 are configured to be able to rotate the one end chuck part 42 and the other end chuck part 43 at different timings in the same direction. The different timings mean that rotations, such as rotating and stopping the other end chuck part 43 first and rotating the one end chuck part 42 in turn, are not synchronized. The same-direction rotating parts 44 include a pair of motors 46 that are controlled by the controller 4 (to be described below), a pair of rotary shafts 47 that are rotated by the pair of motors 46, and a pair of motor fixing parts 48 for fixing the pair of motors 46. In the present embodiment, with regard to the pair of motor fixing parts 48, the left motor fixing part is fixed in a stationary state, and the right motor fixing part is fixed to be movable using the chuck-vertical position changing unit 45 in a vertical direction.

Chuck-Vertical Position Changing Unit 45

In FIGS. 5 and 7, the chuck-vertical position changing unit 45 is configured to be able to change positions of the one end chuck part 42 and the other end chuck part 43 in a vertical direction. In the case of the present embodiment, it is assumed that a structure is adopted in which the right motor 46 moves downward, thereby changing the two positions in the vertical direction. When the configuration and structure are described more concretely, the chuck-vertical position changing unit 45 includes a lowering cylinder 49, an air feeder 50 for feeding air to the lowering cylinder 49, a slider rail 51 extending in a vertical direction, and a guide convex part (reference numeral is omitted) that is provided for the right motor fixing part 48 and is guided by the slider rail 51. As an example, the air feeder 50 is arranged in the box 34. The slider rail 51 is fixed to the frame 5. The chuck-vertical position changing unit 45 is controlled by the controller 4 (to be described below).

Controller 4

In FIGS. 1 and 4, the controller 4 is provided to control operations of the electric wire elevating unit 2 and the electric wire twisting unit 3. As an example, the controller 4 includes a main body 52 that is arranged in the box 34, and an operating part 53 that is fixed to, for instance, a right side of the frame 5 and is operated by a worker. The main body 52 includes a well-known PLC, and so on. The operating part 53 is configured by, for example, touch panel. Various data required to produce the twisted wire 102 (see FIGS. 2A, 2B, 18A, and 18B) are stored in a storage part of the main body 52. As the operating part 53, any part is adopted as long as numerical values can be input.

Method of Producing Long Twisted Wire 102 (No Difference in Wire Length)

A producing process adopted in the twisted wire producing apparatus 1 as described above includes a process of hanging the middles of the electric wires, a process of chucking one ends of the electric wires, a first electric wire hoisting process, a second electric wire hoisting process, a process of chucking the other ends of the electric wires, a tension adding process, a wire length difference absorbing process, an electric wire twisting process, a taping process, and a removing process (wherein the processes are an example. The reason is that the processes are somewhat different from processes provided in a method of producing a short twisted wire 102 (to be described below)).

In producing process as described above, based on the electric wire twisting process, the processes earlier than the electric wire twisting process become pre-processes described. The processes later than the electric wire twisting process becomes subsequent processes.

The following description with reference to FIGS. 12A to 18B is an example of the case in which the wire length difference ΔL does not occur at the two electric wires 101 (see FIGS. 3A and 3B), and thus means production as if the wire length difference absorbing process is not performed. The wire length difference absorbing process will be described below (see FIGS. 24 to 26).

Each process when there is no wire length difference will be described with reference to FIGS. 12A to 18B (as well as with reference to FIGS. 1 to 11 as needed). Here, the apparatus is operated by operation of the operating part 53 from the worker, and details of the operation will be omitted.

Process of Hanging the Middles of the Electric Wires

In the process of hanging the middles of the electric wires illustrated in FIGS. 12A and 12B, work of ejecting the two long electric wires 101 from, for instance, a part rack (an electric wire stock rack) around a worker, and work of hanging the U turn sections 106 of the two electric wires 101 on the electric wire hanging part 10 are performed.

In the work of hanging the electric wire hanging part 10, since the two electric wires 101 are long, the U turn sections 106 are not formed in the middles of the two electric wires 101, but they are bent and formed close to the one ends 103 in a U shape.

The two electric wires 101 are hung on the electric wire hanging part 10 such that the U turn sections 106 do not intersect each other (not to overlap each other in the vertical direction). This is because, when the U turn sections 106 become an intersected state (a state in which the electric wires intersect), a twist pitch (an electric wire pitch) is changed during twisting.

After the U turn sections 106 are hung on the electric wire hanging part 10, work of pressing the U turn sections 106 with the electric wire pressing part 11 is performed (the electric wire pressing part 11 has a hinge portion, and a state of the electric wire pressing part 11 is turned down from an L shape and turned horizontally. Thereby, the U turn sections 106 can be pressed from above.

A central line in a longitudinal direction of the paper in FIGS. 12A and 12B indicates an axis when the electric wire hanging part 10 is raised (hoisted) or lowered, and schematically denotes the elevating guide part 7. In addition to this, central lines in a transverse direction of the paper indicates positions corresponding to a "first prescribed position" and a "second prescribed position (a position of a desired hoisting height)" used in the following description. These positions will be described in the following processes. In addition to these positions, a position of the electric wire hanging part 10 illustrated in FIGS. 12A and 12B is defined to be an "initial position" in the present embodiment.

Process of Chucking One Ends of the Electric Wires

Figure 13A:
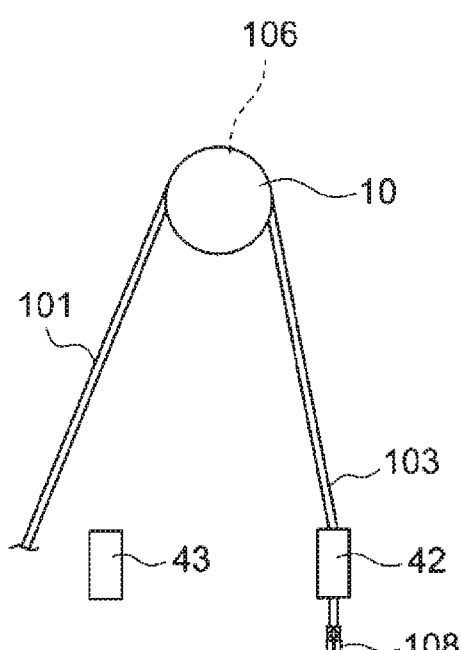
FIGS. 13A and 13B are explanatory views relating to a process of chucking one ends of the electric wires and a first electric wire hoisting process in the twisted wire producing method of the present invention.

In the process of chucking one ends of the electric wires illustrated in FIG. 13A, work of chucking one ends 103 of the two electric wires 101 with the one end chuck part 42 is performed. Although will be understood in the following description, a range corresponding to the one end chuck part 42, particularly a range becoming the vicinity of an electric wire chucking position, becomes a range in which twisting (to be described below) is not performed.

First Electric Wire Hoisting Process

Figure 13B:
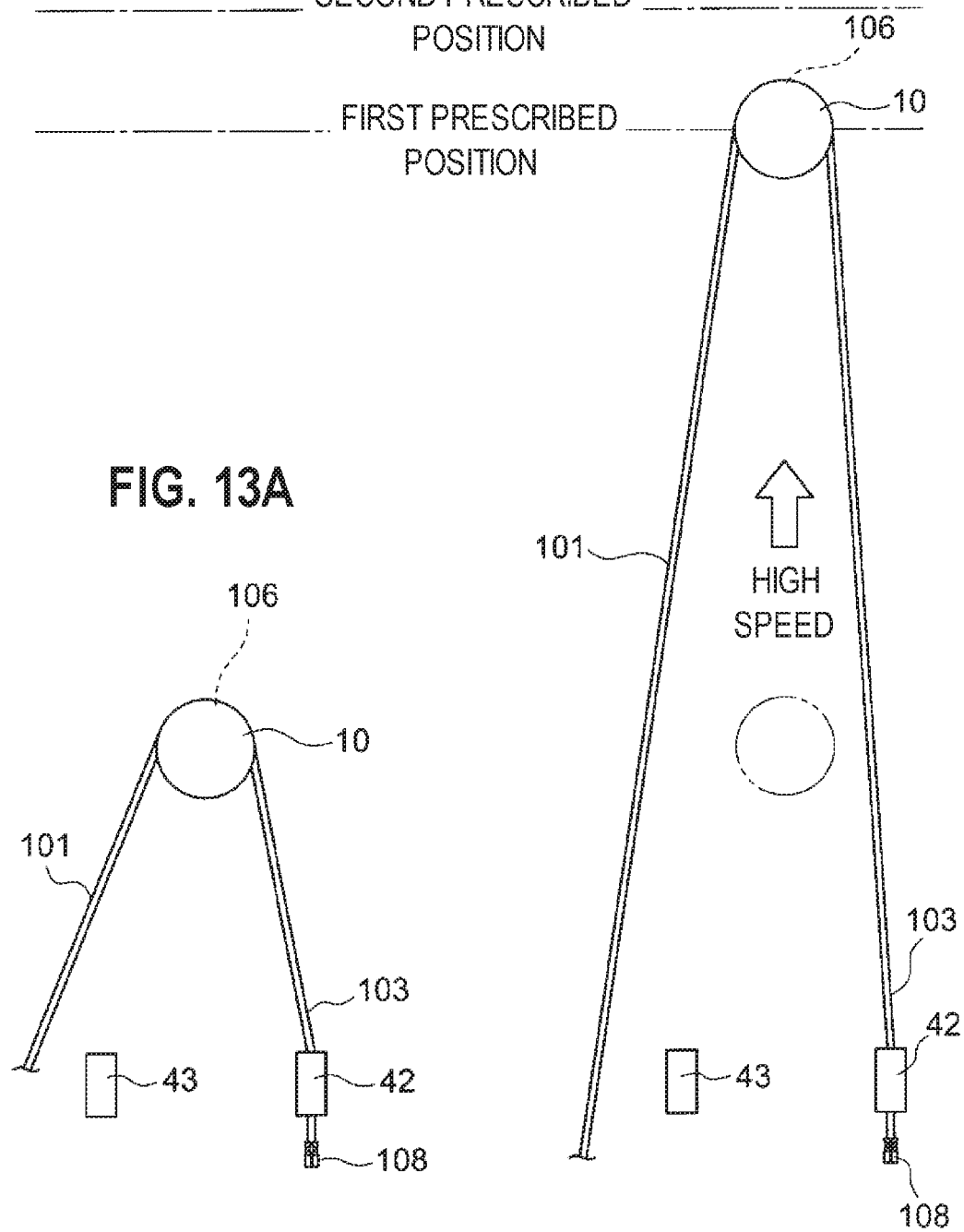

In the first electric wire hoisting process illustrated in FIGS. 13A and 13B, the high/low-speed elevating unit 8 is operated to raise the position of the electric wire hanging part 10 from the "initial position" to the "first prescribed position" above the initial position at a stroke (in the case of the long electric wires 101, when the electric wire hanging part is slowly raised, a time is required as much. Thus, the electric wire hanging part is raised in a short time, that is, at a high speed, and thereby the time is shortened). With regard to the raising at a high speed, the air pressure switching electromagnetic valve part 28d is set to a high air pressure by control (instruction) of the main body 52 of the controller. The raising/lowering switching electromagnetic valve part 28e is set to the raising. The raising of the electric wire hanging part 10 is initiated by these parts. That is, the hoisting of the two electric wires 101 is initiated.

In the first electric wire hoisting process, with the raising of the electric wire hanging part 10, the positions of the U turn sections 106 are changed. When a worker does work of placing a hand at a left electric wire portion (an electric wire portion close to the other ends 104) from the U turn sections 106, flapping of the two electric wires 101 associated with the raising can be suppressed.

When the electric wire hanging part 10 reaches the "first prescribed position," the electric wire hanging part 10 is raised close to (just before) the desired hoisting height (the "first prescribed position" is a position close to the desired hoisting height. In the present embodiment, the first prescribed position is also a position of the sensor 30 approximately in the middle of the elevating guide part 7).

Second Electric Wire Hoisting Process

In the second electric wire hoisting process illustrated in FIGS. 13B and 14A, the high/low-speed elevating unit 8 is operated to slowly raise the position of the electric wire hanging part 10 from the "first prescribed position" to the "second prescribed position (the position of the desired hoisting height)" slightly above the first prescribed position (the electric wire hanging part is slowly raised at a low speed, which aims at preventing a tensile force from being abruptly applied). With regard to the raising at a low speed, when the corresponding sensor 30 is arranged corresponding to the "first prescribed position," and the light shielding part 31 passes through this sensor 30, a signal is sent to the controller main body 52. When the air pressure switching electromagnetic valve part 28d is switched to a low air pressure by the control (the instruction) of the controller main body 52, the raising of the electric wire hanging part 10 at a low speed is initiated. That is, the raising is switched such that the hoisting of the two electric wires 101 is performed by a remaining slight amount up to "the position of the desired hoisting height."

In FIG. 14A, when the electric wire hanging part 10 reaches the "second prescribed position," the electric wire hanging part 10 is raised to the position of the desired hoisting height. In the present embodiment, when a signal is sent from the sensor 30 to the controller main body 52 at the "first prescribed position," a timer is operated at the controller main body 52, the electric wire hanging part 10 is slowly raised for a prescribed time (several seconds), and then a control method in which the electric wire hanging part 10 is exactly stopped at the position of the desired hoisting height is adopted (the control method is an example).

Process of Chucking the Other Ends of the Electric Wires

In the process of chucking the other ends of the electric wires illustrated in FIG. 14B, work of chucking the other ends 104 of the two electric wires 101 with the other end chuck part 43 is performed. At this time, the other ends 104 of the two electric wires 101 becomes a state as illustrated in FIG. 24. That is, the two terminal fittings 108 are disposed at the same position by the terminal contact part 62, and the two electric wires 101 become a state in which they are tucked and held in the chuck main body 63 in the vicinity of the two terminal fittings 108. The two electric wires 101 become a state in which they are stuck between the twist prevention parts 65 (the pair of pins arranged side by side), and the inter-electric wire inserting part 68 becomes a state in which it is stuck between the electric wires of the two electric wires 101.

The process of chucking the other ends of the electric wires may be configured to be performed prior to the aforementioned first and second electric wire hoisting processes.

The positioning of the two terminal fittings 108 as described above is also performed in the process of chucking one ends of the electric wires.

Tension Adding Process

In FIG. 14B, when the position of the electric wire hanging part 10 is raised to the "second prescribed position (the position of the desired hoisting height," a "restoring force" generated by downward contraction of the tension adding part 12 is applied to the two electric wires 101 at this time. That is, excessive tension is applied.

In the present embodiment, the tension adding process is a process in which tension is automatically added.

Electric Wire Twisting Process

In the electric wire twisting process illustrated in FIG. 15A, first to sixth processes below are performed in turn.

First, in a first process, the other end chuck part 43 is rotated, for instance, in a direction of an arrow by the left same-direction rotating part 44. Next, in a second process, as illustrated in FIG. 15B, the other end chuck part 43 is rotated only several times in the opposite direction of the above (so-called untwisting is performed). The twisted section 107 is formed at the left side of the electric wire hanging part 10 by these two processes. Next, in a third process, the chuck-vertical position changing unit 45 is operated to slightly change the positions of the electric wire hanging part 10 and the one end chuck part 42 in a downward direction as illustrated in FIG. 16A. At this time, the positions of the U turn sections 106 hung on the electric wire hanging part 10 are displaced. In other words, a position of the middle untwisted section 109 in which no twist may occur due to contact with the electric wire hanging part 10 is displaced in a clockwise direction.

Figures 17A, 17B:
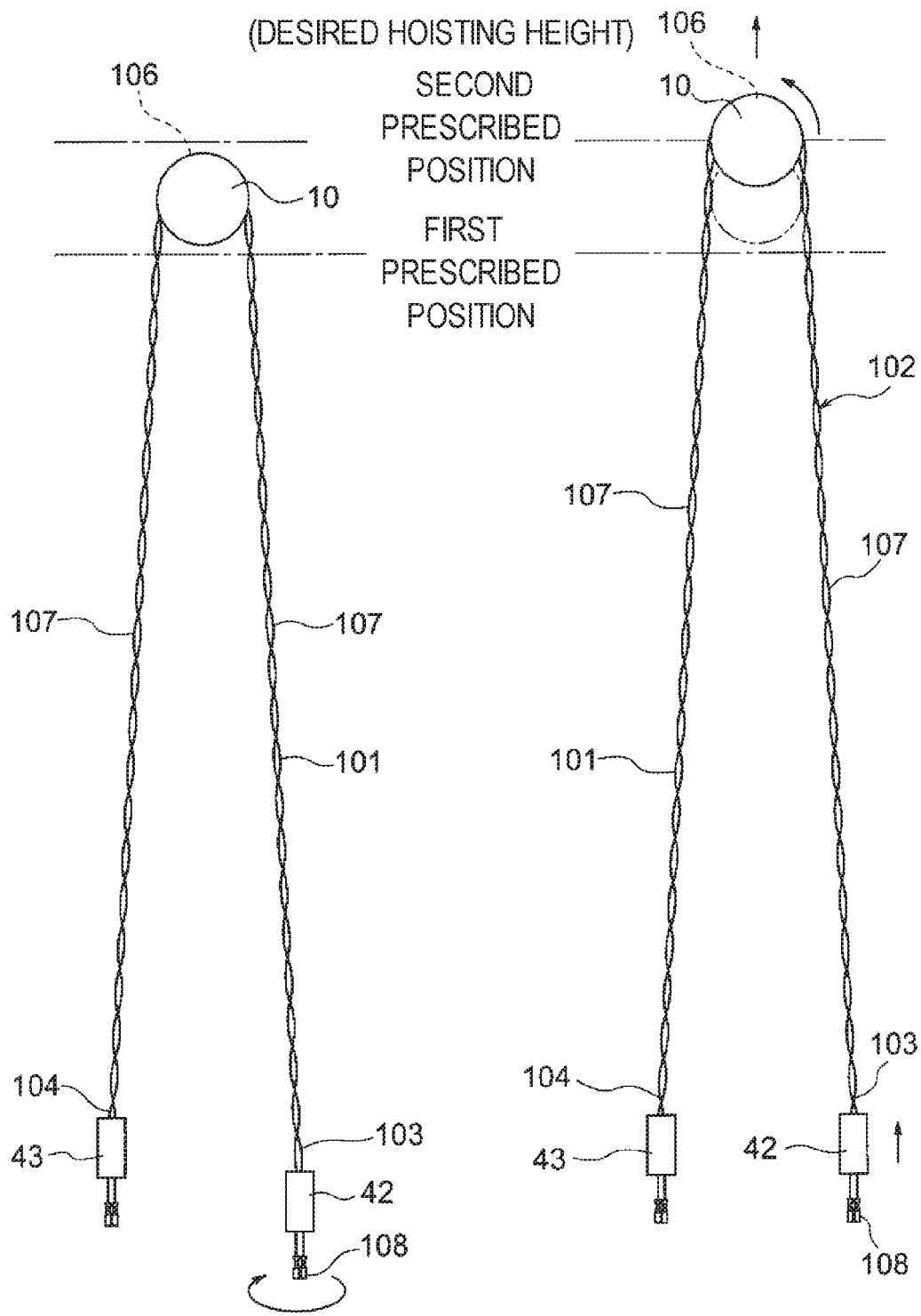
FIGS. 17A and 17B are explanatory views relating to an electric wire twisting process (twisting of one end side) in the twisted wire producing method of the present invention.

Next, in a fourth process, as illustrated in FIG. 16B, the one end chuck part 42 is rotated in a direction of an arrow by the right same-direction rotating part 44. Next, in a fifth process, as illustrated in FIG. 17A, the one end chuck part 42 is rotated only several times in the opposite direction of the above (so-called untwisting is performed). The twisted section 107 is also formed at the right side of the electric wire hanging part 10 by these two processes. Finally, in a sixth process, the positions of the electric wire hanging part 10 and the one end chuck part 42 which are changed in a downward direction are restored. Due to this process, the twisted section 107 is disposed at both sides of the electric wire hanging part 10 at a uniform length.

Taping Process

Figures 18A, 18B:
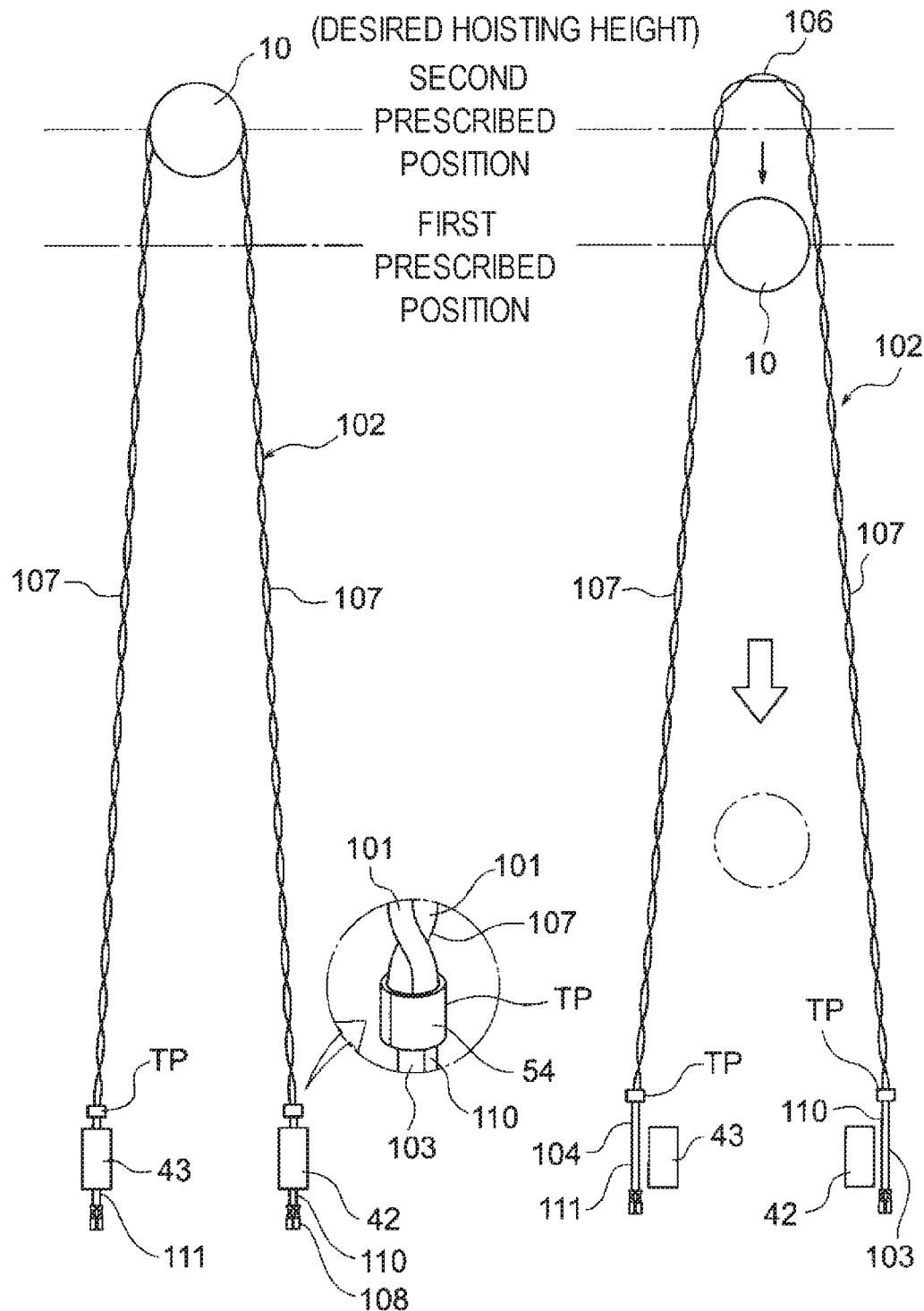
FIGS. 18A and 18B are explanatory views relating to a taping process and a removing process in the twisted wire producing method of the present invention.

In FIG. 18A, work for taping TP is performed in this process. The taping TP is formed by winding a tape 54 at ends of the twisted section 107 around the one end chuck part 42 and the other end chuck part 43. The taping TP is carried out for anti-fraying.

Removing Process

In the removing process illustrated in FIG. 18B, the high/low-speed elevating unit 8 is operated to return the position of the electric wire hanging part 10 from the "second prescribed position (position of the desired hoisting height" to the "initial position." Work of removing one end 103 and the other end 104 of the twisted wire 102 from the one end chuck part 42 and the other end chuck part 43 is also performed. The sequential production is completed by the removal of the twisted wire 102.

In the above description, the production is performed in this order of the "process of hanging the middles of the electric wires," the "process of chucking one ends of the electric wires", and the "process of chucking the other ends of the electric wires". However, for example, the order may be this order of the "process of hanging the middles of the electric wires," the "first electric wire hoisting process," the "second electric wire hoisting process," the "process of chucking one ends of the electric wires," and the "process of chucking the other ends of the electric wires". The order is also slightly given in the description of the process of chucking the other ends of the electric wires, but it may be this order of the "process of hanging the middles of the electric wires," the "process of chucking one ends of the electric wires," the "process of chucking the other ends of the electric wires," the "first electric wire hoisting process," and the "second electric wire hoisting process".

Method of Producing Short Twisted Wire 102 (without Wire Length Difference)

Next, a method of producing (a producing process of) the short twisted wire 102 will be described. Here, the producing process includes a process of hanging the middles of the electric wires, a process of chucking one ends of the electric wires, an electric wire hoisting process (a third electric wire hoisting process), a process of chucking the other ends of the electric wires, a tension adding process, an electric wire twisting process, a taping process, and a removing process.

Hereinafter, the processes will be described with reference to FIGS. 19A to 23B (as well as with reference to FIGS. 1 to 11 as needed).

Process of Hanging the Middles of the Electric Wires

Figure 19A:
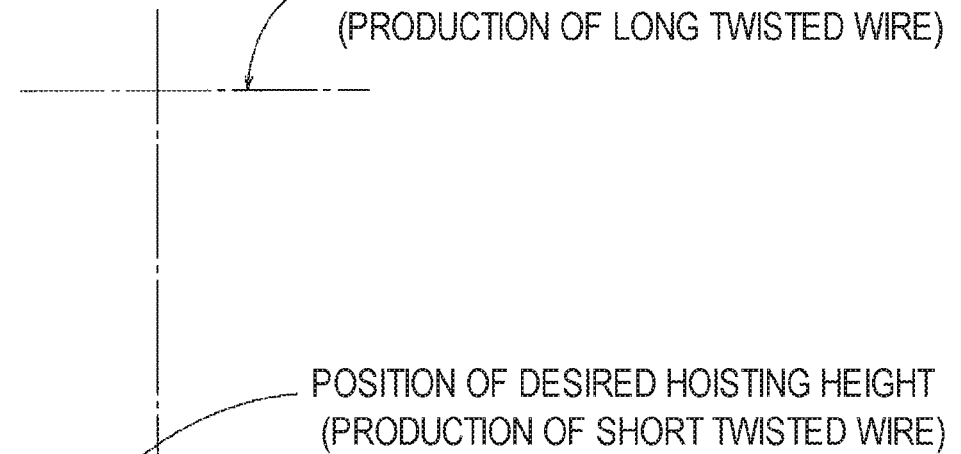
FIGS. 19A and 19B are explanatory views relating to a process of hanging the middles of the electric wires in a twisted wire producing method (in the case of a short twisted wire) of the present invention.
Figure 19B:
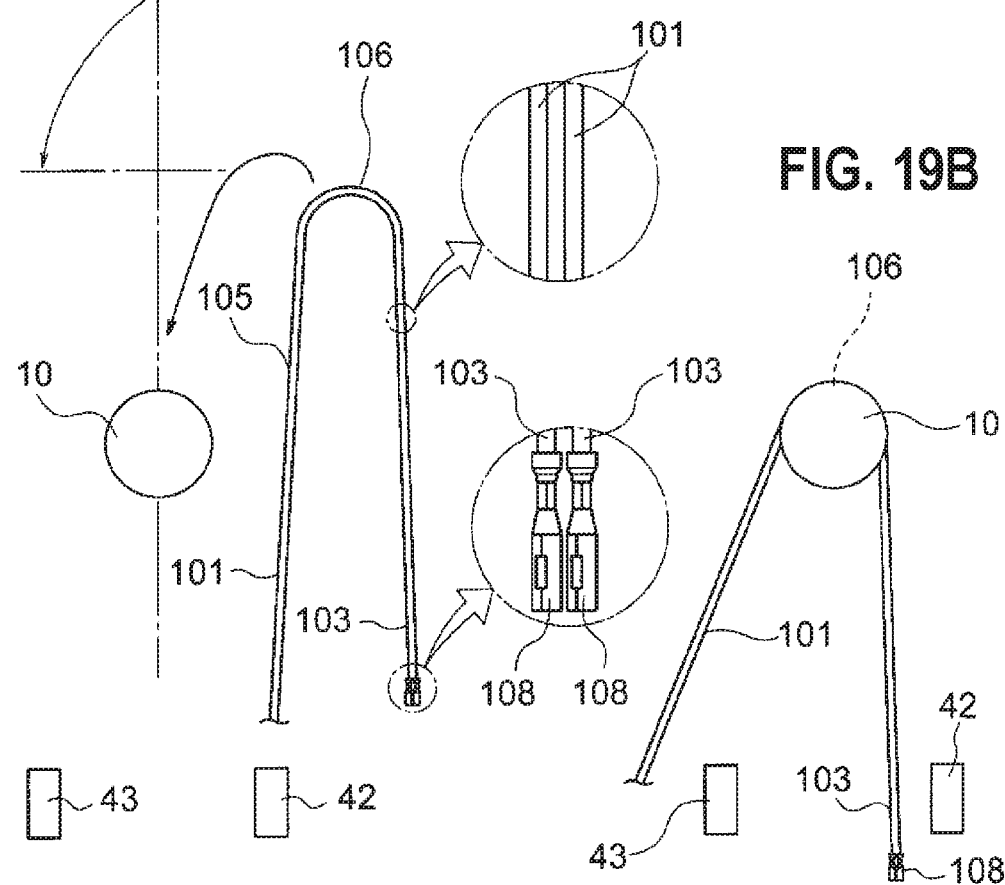

In the process of hanging the middles of the electric wires illustrated in FIGS. 19A and 19B, work of ejecting the two long electric wires 101 from for instance, a part rack (an electric wire stock rack) around a worker, and work of hanging the U turn sections 106 of the two electric wires 101 on the electric wire hanging part 10 are performed.

Process of Chucking One Ends of the Electric Wires

In the process of chucking one ends of the electric wires illustrated in FIG. 20A, work of chucking the one ends 103 of the two electric wires 101 with the one end chuck part 42 is performed.

Electric Wire Hoisting Process (Third Electric Wire Hoisting Process)

In the third electric wire hoisting process illustrated in FIG. 20B, the high/low-speed elevating unit 8 is operated to raise the position of the electric wire hanging part 10 from the "initial position" to the "position of the desired hoisting height" slightly above the initial position at a low speed. With regard to the raising at a low speed, the air pressure switching electromagnetic valve part 28*d* is set to a low air pressure by control (instruction) of the controller main body 52 based on short electric wires 101. The raising/lowering switching electromagnetic valve part 28*e* is set to the raising. When there is, for instance, a button operation of a worker, the slow raising of the electric wire hanging part 10 is initiated by these parts. That is, the hoisting of the two electric wires 101 is initiated.

Here, with regard to the electric wire hoisting process, setting as the "third" is because the "first" and the "second" are used in the aforementioned method of producing a long twisted wire 102, and there is a need to distinguish from each other to operate differently.

The method of producing a short twisted wire 102 is operated as follows without using the sensors 30 provided for the elevating guide part 7. That is, when there is, for instance, a button operation of a worker, a signal thereof is sent to the controller main body 52, and the timer is operated. After the electric wire hanging part 10 is slowly raised for a prescribed time (several seconds), the electric wire hanging part 10 is operated to be exactly stopped at the position of the desired hoisting height.

In the controller main body 52, data such as lengths (wire lengths) and raising strokes of the electric wires 101, a timer time, etc. are previously stored in a time table in numerous patterns. In the case in which the short twisted wire 102 is produced, the timer time is determined from the lengths of the electric wires 101, and air of a low pressure is fed to the elevating cylinder 27 for this timer time. When the electric wire hanging part 10 is slowly raised and stopped at the determined time, the electric wire hanging part 10 exactly comes at the position of the desired hoisting height.

Process of Chucking the Other Ends of the Electric Wires

In the process of chucking the other ends of the electric wires illustrated in FIG. 20C, work of chucking the other ends 104 of the two electric wires 101 with the other end chuck part 43 is performed (see FIG. 24 with regard to a state in which the electric wires are chucked).

Tension Adding Process

In FIG. 20C, when the position of the electric wire hanging part 10 is raised to the "position of the desired hoisting height," a "restoring force" generated by downward contraction of the tension adding part 12 is applied to the two electric wires 101 at this time. That is, excessive tension is applied.

Electric Wire Twisting Process

In the electric wire twisting process illustrated in FIG. 21A, first to sixth processes below are performed in turn.

First, in a first process, the other end chuck part 43 is rotated, for instance, in a direction of an arrow by the left same-direction rotating part 44. Next, in a second process, as illustrated in FIG. 21B, the other end chuck part 43 is rotated only several times in the opposite direction of the above, and untwisting is performed. The twisted section 107 is formed at the left side of the electric wire hanging part 10 by these two processes. Next, in a third process, the chuck-vertical position changing unit 45 is operated to slightly change the positions of the electric wire hanging part 10 and the one end chuck part 42 in a downward direction as illustrated in FIG. 21C. At this time, the positions of the U turn sections 106 hung on the electric wire hanging part 10 are displaced. In other words, a position of the untwisted section 109 is displaced in a clockwise direction.

Next, in a fourth process, as illustrated in FIG. 22A, the one end chuck part 42 is rotated in a direction of an arrow by the right same-direction rotating part 44. Next, in a fifth process, as illustrated in FIG. 22B, the one end chuck part 42 is rotated only several times in the opposite direction of the above, and untwisting is performed. The twisted section 107 is also formed at the right side of the electric wire hanging part 10 by these two processes. Finally, in a sixth process, the positions of the electric wire hanging part 10 and the one end chuck part 42 which are changed in a downward direction are restored as illustrated in FIG. 22C. Due to this process, the twisted section 107 is disposed at both sides of the electric wire hanging part 10 at a uniform length.

Taping Process

Figures 23A, 23B:
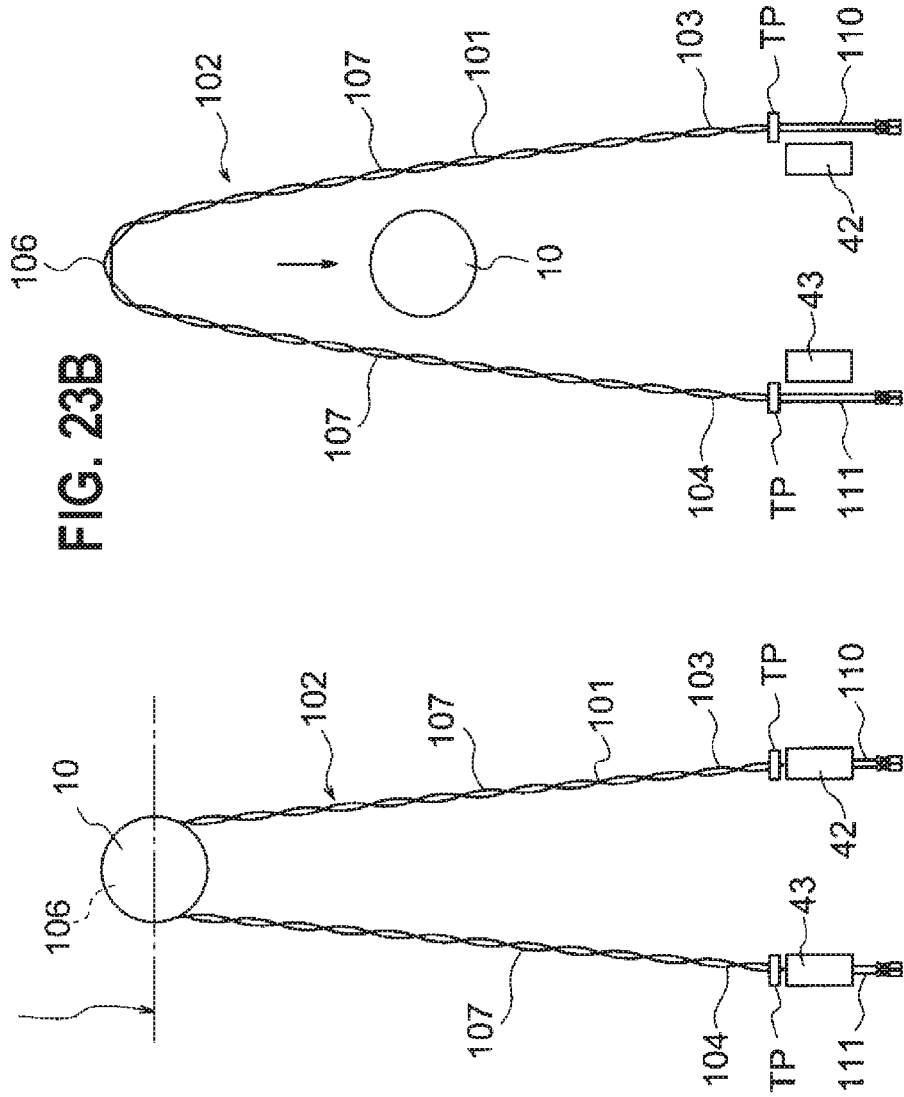
FIGS. 23A and 23B are explanatory views relating to a taping process and a removing process in the twisted wire producing method of the present invention.

In the process illustrated in FIG. 23A, work for taping TP is performed. The taping TP is formed at ends of the twisted section 107 around the one end chuck part 42 and the other end chuck part 43. The taping TP is carried out for anti-fraying.

Removing Process

In the removing process illustrated in FIG. 23B, the high/low-speed elevating unit 8 is operated to return the position of the electric wire hanging part 10 from the "position of the desired hoisting height" to the "initial position." Work of removing one end 103 and the other end 104 of the twisted wire 102 from the one end chuck part 42 and the other end chuck part 43 is also performed. The sequential production is completed by the removal of the twisted wire 102.

Method of Producing Twisted Wire 102 (with Wire Length Difference)

Next, a method (a producing process) in which the long or short twisted wire 102 is produced or the wire length difference ΔL (see FIGS. 3A and 3B) occurs at the two electric wires 101 will be described. Here, this method is different from the method aforementioned with reference to FIGS. 12A to 23B in that a wire length difference absorbing process functions.

Process of Chucking the Other Ends of the Electric Wires

In the process of chucking the other ends of the electric wires illustrated in FIG. 24, work of chucking the other ends 104 of the two electric wires 101 with the other end chuck part 43 is performed. At this time, the other ends 104 of the two electric wires 101 becomes a state as illustrated in the drawing. That is, the two terminal fittings 108 are disposed at the same position by the terminal contact part 62, and the two electric wires 101 become a state in which they are tucked and held in the chuck main body 63 in the vicinity of the two terminal fittings 108. The two electric wires 101 become a state in which they are stuck between the twist prevention parts 65 (the pair of pins arranged side by side), and the inter-electric wire inserting part 68 becomes a state in which it is stuck between the electric wires of the two electric wires 101.

Tension Adding Process

In the tension adding process illustrated in FIG. 25, tension is automatically added to the other ends 104 of the two electric wires 101. To be specific, when the position of the electric wire hanging part 10 is raised to the "second prescribed position (position of the desired hoisting height" (see FIG. 14B), the tension adding part 12 (see FIG. 5) is contracted downward at this time, and thus a "restoring force" of the tension adding part 12 is automatically applied (naturally applied) to the two electric wires 101.

Wire Length Difference Absorbing Process

In the wire length difference absorbing process illustrated in FIG. 25, the wire length difference ΔL (see FIGS. 3A and 3B) occurring at the two electric wires 101 is automatically absorbed. To be specific, when the "restoring force" of the tension adding part 12 is applied to the two electric wires 101, the short electric wire 101 becomes a state in which it is spread straight as illustrated in the drawing due to the wire length difference ΔL. At this time, the short electric wire 101 presses the inter-electric wire inserting part 68, and thus the long electric wire 101 becomes a state in which it is bent in an approximate "<" shape between the chuck main body 63 and the twist prevention parts 65 along with the movement of the inter-electric wire inserting part 68. Since the bent portion of the approximate "<" shape is formed, the long electric wire 101 becomes a state in which it is spread straight at a position above the twist prevention parts 65. Accordingly, in the wire length difference absorbing process, the wire length difference ΔL is automatically absorbed (naturally absorbed).

When the wire length difference ΔL is absorbed, subsequent formation of the twisted section 107 (see FIG. 26) naturally has reliability (since the twisted section 107 is not formed in an uneven state, it has reliability. In other words, since accuracy of the twist pitch is not lowered, the twisted section has reliability).

As illustrated in FIG. 27, the wire length difference absorbing part 66 is also provided for the one end chuck part 42, and thereby the wire length difference absorbing process is performed at both end sides of the wire length difference absorbing part. In this case, the absorption of the wire length difference ΔL is naturally variable.

Effects of Twisted Wire Producing Apparatus 1 and Method of Producing the Same As described above with reference to FIG. 1 to FIG. 27, according to the twisted wire producing apparatus 1 and the method of producing the same, although the variation (the wire length difference ΔL) within the dimensional tolerance within which one of the two electric wires 101 is longer than the other is present at the two electric wires 101, the twisted wire 102 can be produced while this variation is being absorbed by the wire length difference absorbing part 66 or the like.

As in the present invention, if the wire length difference ΔL can be absorbed, the state in which the twisted section 107 is formed at the twisted wire 102 can be stabilized.

According to the twisted wire producing apparatus 1 and the method of producing the same, since the wire length difference absorbing part 66 is arranged at a position corresponding to the terminal untwisted section 111 close to the other end of the twisted wire 102, no hindrance is caused in forming the twisted section 107. As a result, the state in which the twisted section 107 is formed can be further stabilized.

As can be seen from the above, according to the twisted wire producing apparatus 1 and the method of producing the same, the state in which the twisted section 107 is formed can be stabilized, and thus quality can be guaranteed without performing measurement or the like of an inter-wire gap and a characteristic impedance. Accordingly, an effect that the twisted wire producing apparatus 1 and the method of producing the same that have high reliability of the twisted wire 102 and can contribute to reduction in cost can be provided is exerted.

In addition, according to the twisted wire producing apparatus 1 and the method of producing the same, the apparatus and the method become an apparatus and a method having a configuration and structure that secure a space required to produce the twisted wire 102 in a vertical direction rather than a horizontal direction as in a conventional example, and thus the full length of the apparatus can be significantly shortened compared to that of the conventional example.

According to the twisted wire producing apparatus 1 and the method of producing the same, the apparatus and the method become an apparatus and a method having a configuration and structure that dispose the one ends 103 and the other ends 104 of the two electric wires 101 at positions close to each other and produce them. Thus, positions of the ends of the finished twisted wire 102 are close to each other, and it is unnecessary to walk to go to the positions of the ends as in the conventional example. As a result, a burden of a worker can be dramatically reduced.

Further, according to the twisted wire producing apparatus 1 and the method of producing the same, the apparatus and the method become an apparatus and a method having a configuration and structure that can change a speed when the two electric wires 101 are hoisted. Thus, for example, when the long twisted wire 102 is produced, if the speed is set to a low speed before the position of the desired hoisting height or if the speed is set to a low speed from the initial position to the position of the desired hoisting height, a great tensile force is not abruptly applied to the two electric wires 101. As a result, a trouble such as damage can be prevented.

Therefore, as can be seen from the above, according to the present invention, an effect that the twisted wire producing apparatus 1 and the method of producing the same capable of promoting a reduction in installing space or the like and an improvement in workability and preventing a great tensile force from being applied to the two electric wires 101 can be provided is exerted.

According to the present invention, the apparatus and the method become an apparatus and a method having a configuration and structure that hang and hoist the U turn sections 106 made in the middles of the two electric wires 101. Thus, the finished state of the twisted wire 102 can be in an upward U-turned state. As a result, a height of the apparatus becomes half, and thus an installing space can be further reduced.

In the above description, the sensor 30 (see FIG. 1, corresponding to reference numeral 30a) approximately in the middle of the elevating guide part 7 is set to the "first prescribed position." Further, when it is necessary to produce the long twisted wire 102, for example a position of the uppermost sensor 30 (to which the reference numeral 30b corresponds) of FIG. 1 may be set to the "first prescribed position." Thereby, although not particularly illustrated, the long twisted wire 102 can be produced likewise.

Although the detailed description has been omitted, when the short twisted wire 102 is produced, the one ends 103 and the other ends 104 of the two electric wires 101 may be chucked, for instance, by the one end chuck part 42 and the right option chuck part 13, and then the one end chuck part 42 may be rotated to perform the twisting. When the wire length difference ΔL (see FIGS. 3A and 3B) occurs at the two electric wires 101, the other end chuck part 43 may be used.

Naturally, the present invention can be variously modified without departing from the spirit of the present invention.

The absorption of the wire length difference ΔL as in the present invention can also be applied to a laterally long type producing apparatus as in the conventional example.

What is claimed is:
1. A twisted wire producing method for producing a twisted wire having a twisted section and terminal untwisted sections each continuing to corresponding one of sides of the twisted section, the twisted wire includes two wires and each of the wires includes one end and an other end, each of the wires has a respective length and the respective length of one of the wires is longer than the respective length of another one of the wires by a wire length difference, the twisted wire producing method comprising:
   performing pre-processes prior to the twisting process that includes:
      chucking the one ends of the two electric wires with a one end chuck part;
      chucking the other ends of the two electric wires with an other end chuck part that is separate from the one end chuck part;
      adding tension to the two electric wires with a tension adding part; and
      absorbing the wire length difference between the two electric wires using at least the other end chuck part, the wire length difference absorbing process is configured to absorb the wire length difference at a section between a predetermined boundary position and a position at which the electric wires are chucked by the other end chuck part; and
   twisting the two electric wires after performing the pre-processes.

* * * * *